(12) United States Patent
Osborne et al.

(10) Patent No.: US 11,599,363 B2
(45) Date of Patent: Mar. 7, 2023

(54) COMMUNICATION IN A COMPUTER HAVING MULTIPLE PROCESSORS

(71) Applicant: Graphcore Limited, Bristol (GB)

(72) Inventors: Richard Osborne, Bristol (GB); Matthew Fyles, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 85 days.

(21) Appl. No.: 16/840,988

(22) Filed: Apr. 6, 2020

(65) Prior Publication Data

US 2021/0191731 A1 Jun. 24, 2021

(30) Foreign Application Priority Data

Dec. 23, 2019 (GB) ..................... 1919148

(51) Int. Cl.
| | | |
|---|---|---|
| *G06F 9/30* | (2018.01) | |
| *G06F 9/38* | (2018.01) | |
| *G06N 20/00* | (2019.01) | |
| *G06F 9/48* | (2006.01) | |
| *G06F 9/52* | (2006.01) | |
| *G06F 15/80* | (2006.01) | |
| *G06N 3/084* | (2023.01) | |

(52) U.S. Cl.
CPC .......... *G06F 9/3885* (2013.01); *G06F 9/3001* (2013.01); *G06F 9/4881* (2013.01); *G06F 9/522* (2013.01); *G06F 15/80* (2013.01); *G06N 3/084* (2013.01); *G06N 20/00* (2019.01)

(58) Field of Classification Search
CPC ...... G06F 9/3885; G06F 9/4881; G06F 9/522; G06F 15/80
See application file for complete search history.

(56) References Cited

U.S. PATENT DOCUMENTS

| | | | |
|---|---|---|---|
| 5,682,491 A | 10/1997 | Pechanek | |
| 6,092,097 A | 7/2000 | Suzuoka | |
| 6,643,763 B1 | 11/2003 | Starke | |
| 6,738,842 B1 | 5/2004 | Bauer | |
| 10,684,860 B2 * | 6/2020 | Lin | ..................... G06F 12/0875 |
| 2005/0015749 A1 | 1/2005 | Brassac | |
| 2013/0159364 A1 * | 6/2013 | Grider | ................. G06F 16/1865 707/826 |
| 2019/0121784 A1 * | 4/2019 | Wilkinson | .............. G06F 9/522 |
| 2019/0155328 A1 * | 5/2019 | Knowles | ................... G06F 1/12 |

OTHER PUBLICATIONS

Combined Search and Examination Report dated May 12, 2020 for Patent Application No. GB1919148.5.
International Search Report and Written Opinion dated Apr. 1, 2021 for Patent Application PCT/EP2020/086418. 16 pages.

* cited by examiner

*Primary Examiner* — Corey S Faherty
(74) *Attorney, Agent, or Firm* — Haynes and Boone, LLP

(57) ABSTRACT

A computer comprising a plurality of processors, each of which are configured to perform operations on data during a compute phase for the computer and, following a pre-compiled synchronisation barrier, exchange data with at least one other of the processors during an exchange phase for the computer, wherein of the processors in the computer is indexed and the data exchange operations carried out by each processor in the exchange phase depend upon its index value.

18 Claims, 16 Drawing Sheets

COMMUNICATION IN A COMPUTER HAVING MULTIPLE PROCESSORS

CROSS-REFERENCE TO RELATED APPLICATIONS

The present application claims priority to United Kingdom Patent Application No. 1919148.5, filed on Dec. 23, 2019, which is hereby incorporated by reference in its entirety.

TECHNICAL FIELD

The present disclosure relates to controlling data transfer operations carried out between different processors in a computer comprising multiple processors.

BACKGROUND

When performing large scale parallel operations, multiple processors are provided within a computer. Such a computer may be a system in which each processor is provided on a single chip. Each of the processors may itself comprise a plurality of processing units. In some cases, each of the processors may be configured to perform the same set of operations on a different set of data. Each of the processors performs its respective calculations during a compute phase, before exchanging results with one or more of the other processors during an exchange phase. A pre-compiled barrier is imposed between a compute phase and an exchange phase. The exchange of results allows synchronisation to be achieved between different processors that each perform different tasks in the context of a larger operation.

One example of the application of a computer comprising multiple processors is found in the context of machine learning algorithms, for example, in the context of deep neural networks. As will be familiar to those skilled in the art of machine intelligence, a machine intelligence algorithm is based around performing iterative updates to a "knowledge model", which can be represented by a graph of multiple interconnected nodes. Each node represents a function of its inputs. Some nodes receive the inputs to the graph and some receive inputs from one or more other nodes, whilst the output of some nodes form the inputs of other nodes, and the output of some nodes provide the output of the graph (and in some cases a given node may even have all of these: inputs to the graph, outputs from the graph and connections to other nodes). Further, the function at each node is parameterized by one or more respective parameters, e.g. weights. During a learning stage the aim is, based on a set of experiential input data, to find values for the various parameters such that the graph as a whole will generate a desired output for a range of possible inputs. Various algorithms for doing this are known in the art, such as a back propagation algorithm based on stochastic gradient descent. Over multiple iterations based on the input data, the parameters are gradually tuned to decrease their errors, and thus the graph converges toward a solution. In a subsequent stage, the learned model can then be used to make predictions of outputs given a specified set of inputs or to make inferences as to inputs (causes) given a specified set of outputs.

Typically, at least some of the processing of each node can be carried out independently of some or all others of the nodes in the graph, and therefore large graphs expose great opportunities for concurrency and/or parallelism. Each processing unit is a computer that can be used to perform processing associated with a different node. In this way, a plurality of processing units may collectively be used to train a single neural network. This is achieved by applying data parallelism in which each processing unit derives updates to weights for each processing unit of a neural network using a different data set. The updates are then synchronised between the processing units during an exchange phase.

Therefore, it may be understood that when exchanging data between the processors of a computer, each of the processors exchanges different fragments of data at different times. Furthermore, each of the processors may be configured to perform different operations, such as storage of data and reduction, with respect to received data that are dependent upon the position of the respective processor in the computer. There is, therefore, a need to ensure that each processor in the computer performs its respective operations at the appropriate time.

SUMMARY

As noted, in order to ensure that data is exchanged between processors of the computer, each processor performs the appropriate operations for data exchange at the appropriate time. One way to achieve this is to compile a different set of executable code (an executable image) for each processor in the computer. By compiling a different set of code for each processor, each processor can be programmed to perform the appropriate operations for the data exchange at different times so as to allow for appropriate data exchange between the processors. However, there are problems associated with compiling a separate program for each processor, which is that the compilation time increases significantly with the number of processors, such that the compilation time may become undesirably large.

The present disclosure provides a technique for exchanging data between processors, which is particularly applicable for use when performing training using machine learning models, but is not limited to this context.

According to embodiments of the application, each of a set of processors in a computer are provided with a single set of executable computer code, which may take the form of an executable image. Each of the set of processors is provided with an index value, which determines which operations expressed in the set of executable computer code are performed at a particular time during execution. The operations depending upon the index value are operations that control the exchange of data between the processors. Therefore, the processors are configured to perform the appropriate exchange operations in dependence upon their respective index values without requiring separate sets of executable code to be compiled for each processor.

According to a first aspect, there is provided a computer comprising a plurality of processors, each of which are configured to perform operations on data during a compute phase of the computer and, following a pre-compiled synchronisation barrier, exchange data with at least one other of the processors during an exchange phase of the computer, each processor comprising: at least one storage comprising a program comprising a set of executable instructions and an index value identifying the respective processor amongst the plurality of processors; at least one data memory storing data for use in calculations specified by the executable instructions; at least one execution unit arranged to execute one or more of the respective set of executable instructions to: select, in dependence upon the respective index value, operations for performing data transfer between the respective at least one data memory and the respective at least one other of the processors during the exchange phase for the computer; and perform the selected operations for performing data transfer during the exchange phase.

In some embodiments, there is provided a computer, wherein for each of at least some of the processors, the selecting, in dependence upon the respective index value, operations for performing data transfer comprises selecting the respective at least one other of the processors to which data is transferred.

In some embodiments, for each of at least some of the processors, the operations cause data transfer between a region of the respective at least one data memory selected in dependence upon the respective index value, and the respective at least one other of the processors.

In some embodiments, for each of the at least some of the processors, the respective at least one execution unit is configured to calculate the address of the respective region of data memory by performing arithmetic operations on the respective index value.

In some embodiments, for each of the at least some of the processors, the respective at least one execution unit is configured to branch to at least one instruction in the respective set of executable instructions in dependence upon the respective index value, wherein each of the at least one instruction, when executed by the respective at least one execution unit, causes data transfer between the respective region of data memory and the respective at least one other of the processors.

In some embodiments, for each of the at least some of the processors, the operations comprise storing data received from the respective at least one other of the processors in the respective region of data memory.

In some embodiments, for each of at least some of the processors, the operations comprise selecting, in dependence upon the respective index value, data stored in the respective at least one data memory and transmitting the selected data to the respective at least one other of the processors.

In some embodiments, the at least one execution unit of each of the least some of the processors is configured to process the respective selected data to produce a data packet comprising the respective selected data and a header comprising an address of a buffer on the respective at least one other of the processors.

In some embodiments, the computer comprises routing hardware configured to statically route data that is transferred in the data transfer.

In some embodiments, for each of at least some of the processors: the operations comprise combining data received from the respective at least one other of the processors with further data stored in the respective at least one data memory; and the respective at least one execution unit is configured to select the further data from the respective at least one data memory in dependence upon the respective index value.

In some embodiments, for each of the processors: the respective at least one data memory comprises a plurality of delta weights for at least one machine learning model; and the data transfer between the respective at least one data memory and the respective at least one other of the processors comprises controlling the transfer of one or more of the delta weights between the respective at least one data memory and the respective at least one other of the processors.

In some embodiments, for each of the at least some of the processors, the respective at least one execution unit is configured to select the one or more delta weights from the respective data memory in dependence upon the respective index value and cause the transfer of the selected one or more delta weights to the respective at least one other of the processors.

In some embodiments, for each of the at least some of the processors, the respective at least one execution unit is configured to: select the one or more delta weights from the respective data memory in dependence upon the respective index value; and reduce the selected one or more delta weights with one or more further delta weights received from the respective at least one other of the processors of the plurality of processor.

In some embodiments, each processor in the computer is a system on chip.

According to a second aspect, there is provided a computer implemented method of generating multiple programs, each of which being suitable for execution by an execution unit of a computer comprising a plurality of processors, each processor having at least one memory for holding a respective program, at least one execution unit for executing the respective program and data storage for holding data, the method comprising: compiling a single set of executable instructions; determining, for each processor, an index value, associated with the respective processor; and generating, for each processor, a local program comprising the single set of instructions and the respective index value, wherein each local program, when allocated to its respective processor, is scheduled to execute on the at least one execution unit of the respective processor to cause: perform operations on data during a compute phase for the computer selecting, in dependence upon the respective index value, of operations for performing data transfer between the respective at least one data memory and the respective at least one other of the processors during the exchange phase for the computer; and following a pre-compiled synchronisation barrier, performing of the selected operations for performing data transfer during an exchange phase.

In some embodiments, for each local program, the selecting, in dependence upon the respective index value, operations for performing data transfer comprises selecting the respective at least one other of the processors to which data is transferred.

In some embodiments, for each local program, the operations cause data transfer between a region of the respective at least one data memory selected in dependence upon the respective index value, and the respective at least one other of the processors.

In some embodiments, for each local program, the respective at least one execution unit is configured to calculate the address of the respective region of data memory by performing arithmetic operations on the respective index value.

In some embodiments, each local program, the respective at least one execution unit is configured to branch to at least one instruction in the respective set of executable instructions in dependence upon the respective index value, wherein each of the at least one instruction, when executed by the respective at least one execution unit, causes data transfer between the respective region of data memory and the respective at least one other of the processors.

In some embodiments, each local program, the operations comprise storing data received from the respective at least one other of the processors in the respective region of data memory.

In some embodiments, each local program, the operations comprise selecting, in dependence upon the respective index value, data stored in the respective at least one data memory and transmitting the selected data to the respective at least one other of the processors.

In some embodiments, wherein each local program, when allocated to its respective processor, is scheduled to execute on the at least one execution unit of the respective processor to cause: processing of the respective selected data to produce a data packet comprising the respective selected data and a header comprising an address of a buffer on the respective at least one other of the processors.

In some embodiments, the computer comprises routing hardware configured to statically route data that is transferred in the data transfer.

In some embodiments, for each local program, the operations comprise combining data received from the respective at least one other of the processors with further data stored in the respective at least one data memory; and the respective at least one execution unit is configured to select the further data from the respective at least one data memory in dependence upon the respective index value.

In some embodiments, for each of the local programs, the respective at least one data memory comprises a plurality of delta weights for at least one machine learning model; and the data transfer between the respective at least one data memory and the respective at least one other of the processors comprises controlling the transfer of one or more of the delta weights between the respective at least one data memory and the respective at least one other of the processors.

In some embodiments, for each of the local programs, the respective at least one execution unit is configured to select the one or more delta weights from the respective data memory in dependence upon the respective index value and cause the transfer of the selected one or more delta weights to the respective at least one other of the processors.

In some embodiments, for each of the local programs, the respective at least one execution unit is configured to: select the one or more delta weights from the respective data memory in dependence upon the respective index value; and reduce the selected one or more delta weights with one or more further delta weights received from the respective at least one other of the processors of the plurality of processor.

In some embodiments, each processor in the computer is a system on chip.

BRIEF DESCRIPTION OF THE DRAWINGS

For a better understanding of the present disclosure to show how the same may be carried into effect, reference will now be made by way of example to the accompanying drawings.

DETAILED DESCRIPTION

Aspects of the present disclosure have been developed in the context of a computer comprising multi-tile processors, which are designed to act as accelerators for machine learning workloads. However, the disclosure is not limited to the machine learning context. The accelerator comprises a plurality of interconnected processors. In some embodiments, each processor may take the form of a multi-tile processor. The multi-tile processors, which may be used to implement embodiments of the disclosure are described in U.S. patent application Ser. No. 15/886,315, which is incorporated herein by reference. Alternatively, each processor may simply take the form of a single monolithic processor.

Example embodiments of the disclosure will now be described in more detail with reference to the accompanying Figures.

Figure 12:
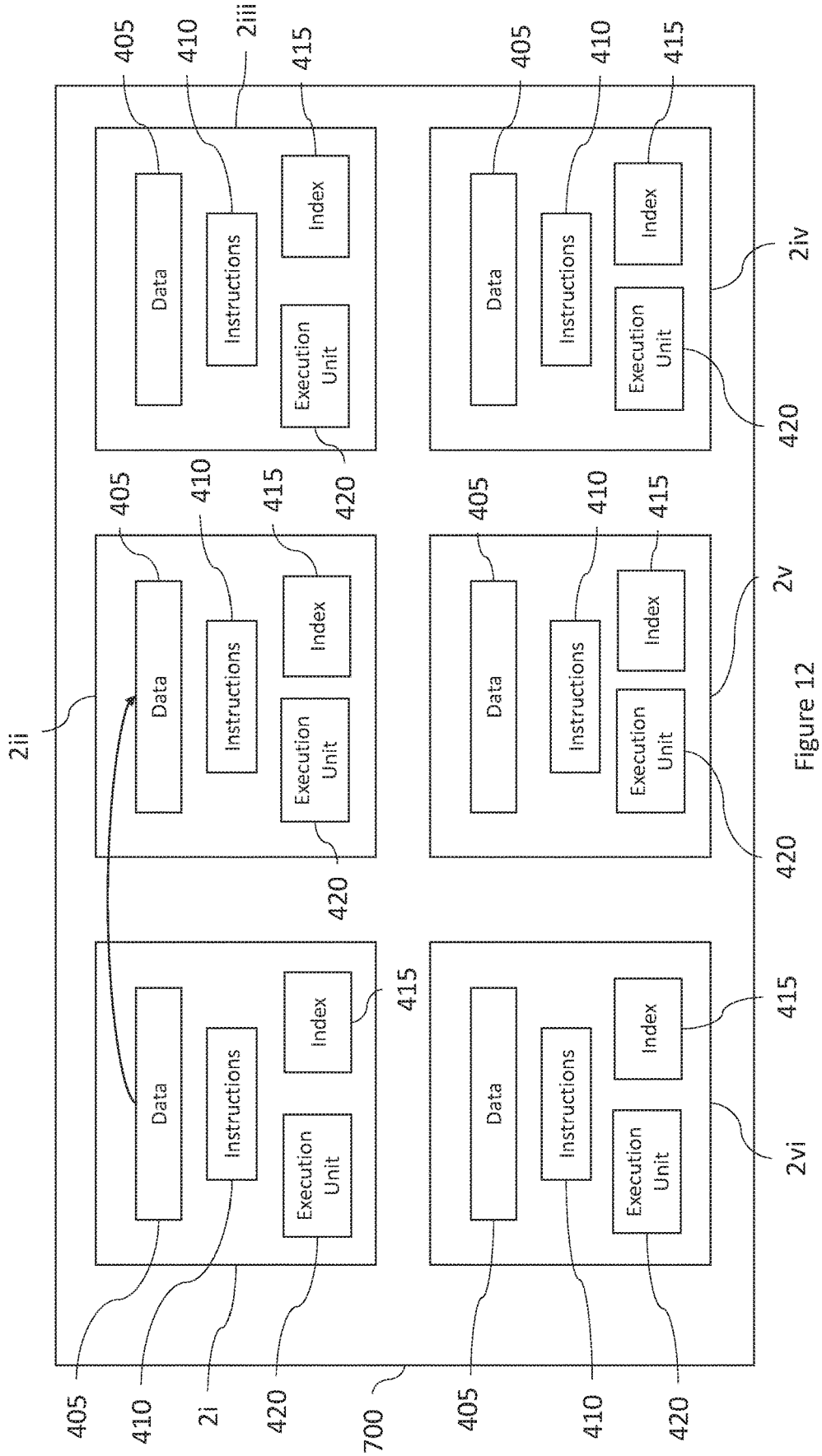
FIG. 12 is a schematic diagram of the exchange of data between processors according to operations selected in dependence upon an index value.

Reference is made to FIG. 12, which illustrates an example of a computer 700 according to embodiments of the application. The computer 700 comprises a plurality of processors 2i, 2ii, 2iii, 2iv, 2v, 2vi (collectively referenced as processors 2). Each of the processor 2 is embodied in an integrated circuit, otherwise known as a chip. Each of the processors 2 is, therefore, a system on chip.

Each of the plurality of processors 2 comprises at least one instruction memory 410 storing instructions executable by at least one execution unit 420 of the respective processor 2. Each processor 2 also comprises at least one storage 415 storing an index value. Although each of the units of storage 405, 410, 415 is shown as a separate storage element in FIG. 12, in some embodiments, two or more of these may form part of a single memory unit. Although each of the units of storage 405, 410, 415 is shown as a contiguous memory bank, each of one or more of the units of storage 405, 410, 415 may comprise a plurality of memory units distributed throughout the respective processor 2. Similarly each of the at least one execution units 420 may be a plurality of execution units. The index storage 415 may be a register.

Together, the set of instructions in the instruction memory 410 and index in the index storage 415 constitute a program for the respective processor 2. Each processor 2 comprises at least one execution unit configured to execute instructions held in instruction memory 410 to modify data values held in the data memory 405 and to perform operations to transfer data to and from other processors 2. The instructions in instruction memory 410 are the same in each of the processors 2. However, the index value held in index storage 415 differs between processors 2. Each processor 2 of computer 700 stores a different index value in its respective index storage 415. The index value held in storage 415 by each processor 2 uniquely identifies that processor 2 in the processors 2 of the computer 700. Each of the processors 2 is configured to perform a different set of data transfer operations in dependence upon its stored index value so as to appropriately transfer data between the processors 2 of the computer 700. The index value controls which data from the memory 405 is transferred, and controls the operations that are performed with respect to received data.

Routing hardware (not shown in FIG. 12) is located in the computer 700 for routing the data between the processors 2. The routing hardware takes the form an external interconnect 72 as described in more detail with respect to FIG. 10. The data is sent between the processors 2 in the form of data packets. The routing hardware is configured to statically route the data packets. In static routing, the routing hardware comprises a routing table comprising fixed routing information for routing the data packets.

The computer 700 alternates between compute phases and exchange phases. During a compute phase, each of the processors 2 in the computer performs computations until reaching a pre-complied synchronisation barrier. After the barrier, the computer 700 moves into the exchange phase, where the processors 2 exchange data with one another.

Some of the instructions in the instruction memory 410, when executed by the execution unit 420, cause the execution unit 420 to perform calculations using the data held in data memory 405. Some of the instructions in the instruction memory 410, when executed by the execution unit 420, cause transfer of data held in data memory 405 to another one of the processors 2. Some of the instructions in the instruction memory 410, when executed by the execution unit 420, cause storage of the data received from a further one of the processors 2 in data memory 405 of the processor.

Therefore, instructions are executed by the execution unit 420 to control data transfer between the processor 2 comprising the execution unit 420 and a further processor of the computer 700. The index stored in index storage 415 is used by the execution unit 420 to control the data transfer. This may be implemented is different ways. In some embodiments, an instruction from the instruction memory 410 takes the index value as an input and, when executed, causes the execution unit 420 to determine how the data transfer is to be performed in dependence upon calculations performed on the index value. In some embodiments, the index value is used to select a particular instruction from the instruction memory 410 to perform a certain data transfer operation.

The index value may be used by the execution unit 420 to select the particular processor of the plurality of processors 2 to which data is to be transferred from the data memory 405. In one example, processor 2*i* selects, on the basis of the index value stored in index storage 415, the processor 2*ii* from the plurality of processors. The execution unit 420 then causes the data to be transferred to the selected processor 2*ii*. In order to do so, the execution unit 420 processes the data to produce data packets containing an address of the processor 2*ii*, and then dispatches the packets, which are provided by routing hardware of the computer 2 to the processor 2*ii*.

The index value may be used by the execution unit 420 to select the address on the destination processor in which the data is to be stored. For example, the execution unit 420 of processor 2*i* determines, on the basis of the index value of processor 2*i*, an address in data memory 205 of processor 2*ii*. The execution unit 420 then processes the data to be transferred to processor 2*ii* to produce one or more data packets comprising one or more headers containing the address in memory 405 of processor 2*ii* at which the data is to be stored. The execution unit 420 the causes these data packets to be sent to processor 2*ii*, where they are stored in the memory 405 at the address indicated in the headers of the data packets.

The index value may be used by the execution unit 420 to select the particular data from data memory 405 that is to be transferred. The execution unit 420 determines an address in data memory 405 of the data to be transferred. The execution unit 420 then causes the selected data to be transferred to one of the processors, e.g. processor 2*ii*. The execution unit may determine the address in data memory 405 of the data to be transferred by performing a calculation taking the address of the index value as an input or by selecting an instruction from the instruction memory 405 for causing the particular data to be transferred.

The index value may be used by the execution unit 420 to control the handling of received data at a processor 2. For example, when processor 2*ii* receives the data from processor 2*i*, the execution unit 420 of the processor 2*ii* may use the respective index value to control where in data memory 405 the data is stored. Additionally or alternatively, when the processor 2*ii* receives the data from the processor 2*i*, the execution unit 420 of the processor 2*ii* may use the respective index value to select data from data memory 405 and to perform an operation (e.g. combining the data) involving both the received data and the data selected from memory 405. The processor 2*ii* may then store the result of the operation in memory 405.

Although in FIG. 12, only the data transfer between the processors 2*i* and 2*ii* is shown, it would be appreciated that data transfer may be carried out between other processors 2 in the computer 700, and that for each processor 2, the index value of the respective processor 2 may be used to select the particular data transfer operations to be performed in any of the ways described above for processors 2*i* and 2*ii*.

Figure 1:
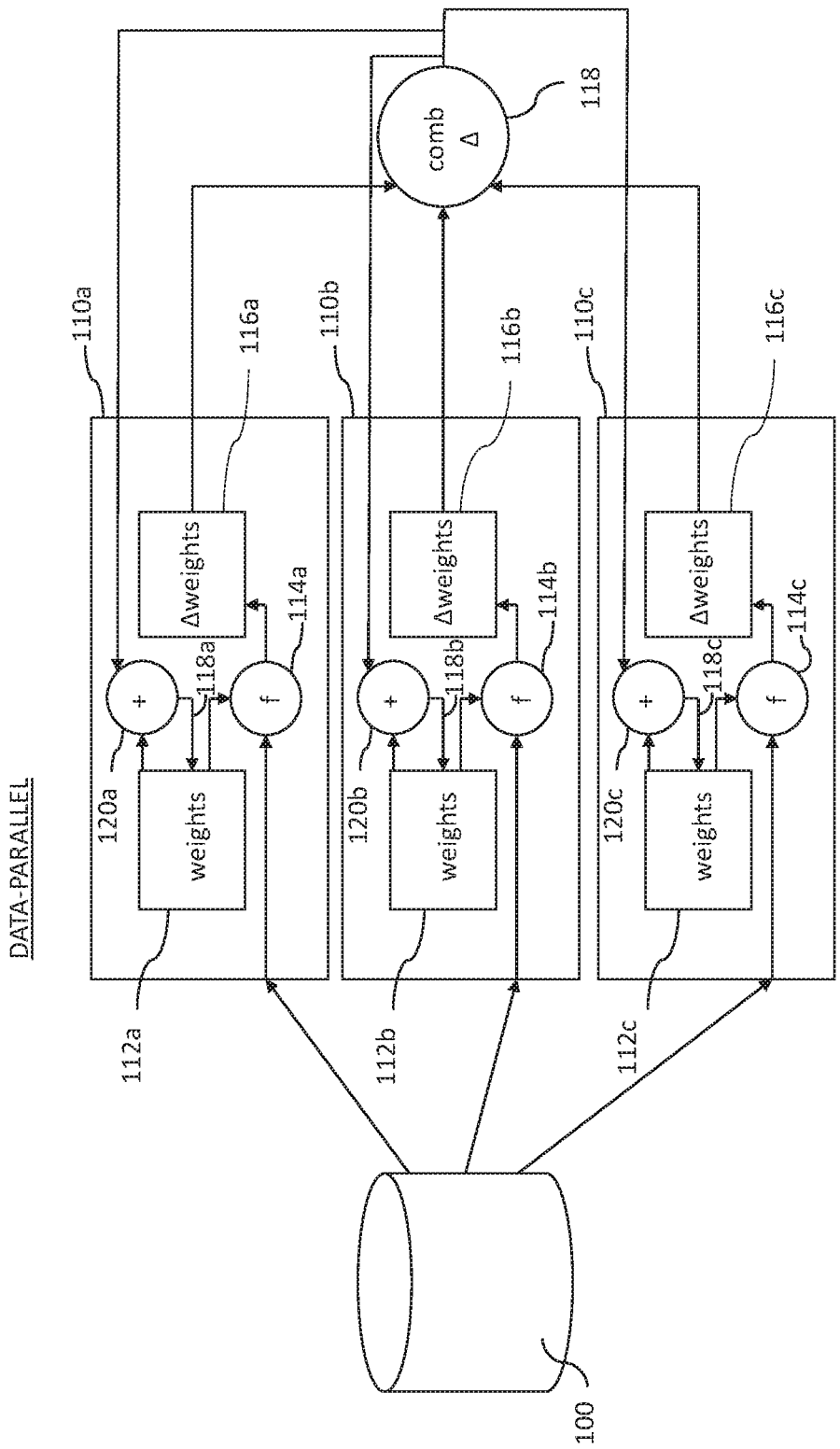
FIG. 1 is a schematic diagram illustrating distributed training in a neural net.

Embodiments of the disclosure may be applied for the exchange of data between processors of a computer when training a machine learning model. In order to explain such an example application of the disclosed techniques, reference is made to FIG. 1, which shows a schematic block diagram of a distributed architecture for training a neural network. A source of training data 100 is provided. This may be a database or any other kind of data store capable of holding training data applicable to the neural network model being trained. Processing according to the neural network model is itself distributed across multiple processors 110*a*, 110*b*, 110*c* etc. Only three units are shown in FIG. 1, but it will readily be appreciated that any number of processors could be utilised. Each processor 110*a*, *b*, *c* receives batches of training data from the training data source 100. Each processor 110*a*, *b*, *c* holds a set of parameters 112*a*, 112*b*, 112*c* which define the model. An incoming batch of training data is processed with a current set of parameters in a calculation function 114 and the results of the calculation function 114 are used to generate so-called deltas which represent the difference between the original parameter and the new parameter as a result of applying the calculating function on the batch of training data and the current set of parameters. In many neural networks, these parameters are termed "weights" and so the delta values are termed "delta weights". The weights are labelled 112*a*, *b*, *c* and the delta weights are labelled 116 *a*, *b*, *c* in FIG. 1. It will be appreciated that in practice, the weights and delta weights are stored in suitable stores accessible by the processor. If the weights and delta weights can be held in local memory, this renders the training process much more efficient.

The aim with the architecture of FIG. 1 is not to train three separate models but to train a single model in a distributed manner. Therefore, the purpose is to have the model parameters (or weights) converged to a single common set in each processor. Starting from any particular set of weights, and assuming that the batch of training data received at each processor is not identical, then there will be a variation in the delta weights which are produced by each calculation function in each processor. What is needed therefore is a way to distribute the delta weights across the processors after each iteration of batched training data. This is shown diagrammatically in FIG. 1, where a combinational function 118 receives the delta weights from each processor and performs a mathematical function which reduces the delta weights, such as an averaging function. The output of the combinatorial function 118 is then fed back to combining circuitry 120a, 120b and 120c within each processor respectively. A new set of weights is thus produced as a combination of the original weights and the combined output from the combinatorial function 118, and the new weights 118a, 118b, 118c are stored back into local memory. Then, the next batch of training data is supplied to each processor and the process repeats multiple times. If the starting weights of the processors are the same, then after each iteration they will be reset again to the same, new values. Delta weights are supplied to the combinatorial function 118 where they are reduced, and they are then supplied back to each of the processors in their reduced form, where they can be combined with the original weights.

One way in which the exchange of data may be efficiently implemented between processors is through the use of collectives, which are routines commonly used when processing data in a computer. They are routines which enable data to be shared and processed across multiple different processes, which may be running on the same processor or different processors. For example, if one process reads data from a data store it can use a "broadcast" process to share that data with other processes. Another example is when the result of a particular function is needed on multiple processes. A "reduction" is a result which has required the application of a compute function to a data value from each of multiple processes. "Gather" and "Scatter" collectives handle more than one data item. Certain collectives have become increasingly important in processing machine learning applications.

MPI (Message Passing Interface) is a message passing standard which can be applied to many parallel computing architectures. MPI defines a number of collectives applicable to machine learning. One such collective is termed "all-reduce". An all-reduce operation enables a result of a compute function acting on multiple data values from different source processes to be provided at a receiving process. Note that a receiving process may be one of the source processes, and that there may be multiple receiving processes. The all-reduce collective reduces the data values from multiple source processes and distributes the results to all the source processes, (which are acting as receiving processes for the reduced result). According to the MPI Standard, the all-reduce collective is implemented by reducing the data values from all source processes in a reduce collective (e.g. at one of the processes) and then broadcasting the result to each source process.

Figure 1A:
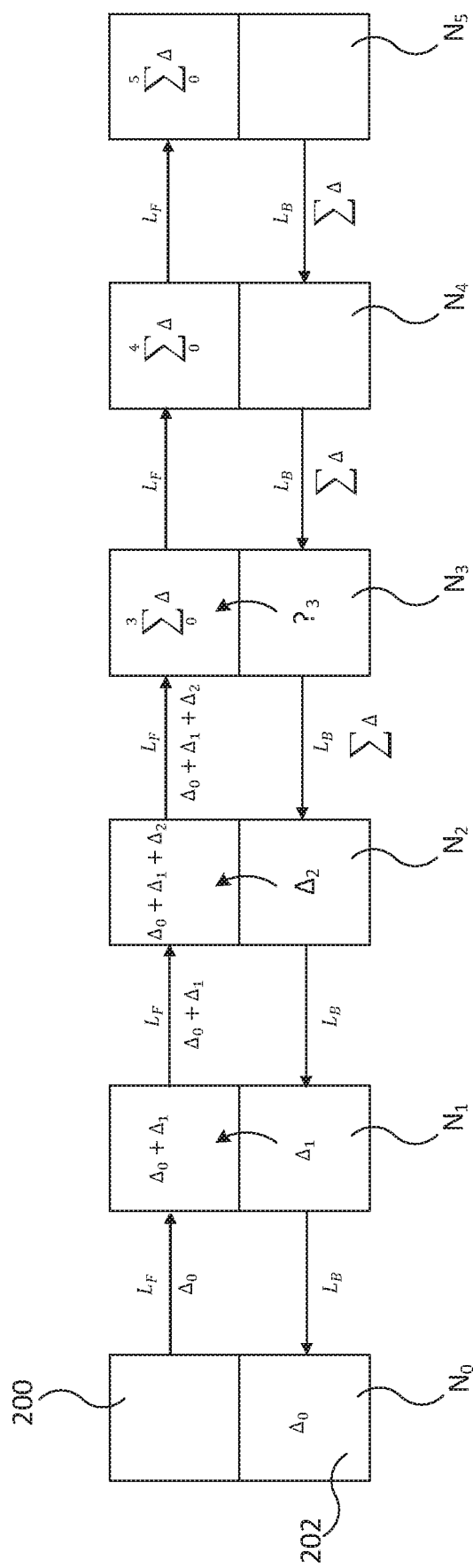
FIG. 1A is a schematic diagram showing a line of processors for implementing a simple "streaming" line all-reduce algorithm.

FIG. 1A is a schematic diagram to illustrate how an all-reduce collective might be implemented in a line connected topology of five processors $N_0 \ldots N_5$. These processors may correspond to the processors of FIG. 1 in which the combinational function is distributed. The processors are shown connected in a line configuration where each processor is connected to its neighbour by a "forwards" links $L_F$ and a "backwards" link $L_B$. As shown in the diagram, and as the directional phrases imply, the forward links connect processors from the left to right in FIG. 1A, and the backwards links connect processors from the right to left in FIG. 1A. Each processor has a processing capability designated 200, and a storage capability designated 202. Each processor also has one or more link interface which enables it to be connected to its neighbouring processor via the links $L_F/L_B$.

Figure 2:
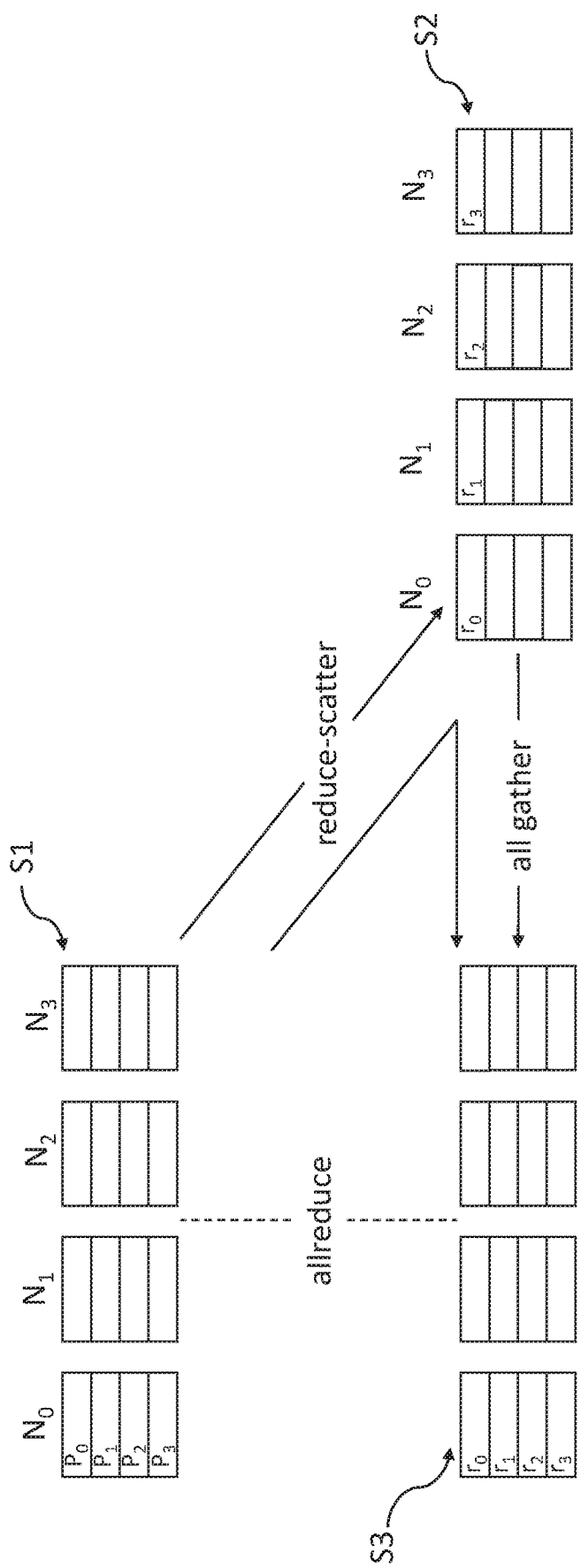
FIG. 2 is a schematic diagram of an all-reduce operation.

The all-reduce collective, which may be used to exchange the delta weights between processors, is illustrated in FIG. 2. FIG. 2 shows a set (vector) of partial values or "partial" $P_0$, $P_1$, $P_2$, $P_3$ on each of four processors in a starting state S1. In this context, a processor is a processor in a network of processors. Note that each processor $N_0$, $N_1$, $N_2$, $N_3$ has four "corresponding" partials $P_0$, $P_1$, $P_2$, and $P_3$. That is, each partial has a position in a vector such that $P_0(n)$ has the same position in its vector on processor n as $P_0(n+1)$ in its vector on processor n+1. The suffix (n) is used to denote the processor in which the partial resides—thus $P_0(0)$ is the partial $P_0$ on processor $N_0$. In a reduce-scatter pass, corresponding partials are reduced and the reduction provided to one of the processors. For example, partials $P_0(0)$, $P_0(1)$, $P_0(2)$, $P_0(3)$ are reduced (to $r_0$) and placed onto processor $N_0$. Similarly, partials $P_1(0)$, $P_1(1)$, $P_1(2)$ and $P_1(3)$ are reduced (to $r_1$) and placed onto processor $N_1$. And so forth so that in an intermediate state S2, each processor has one of the reductions $r_0$, $r_1$, $r_2$ and $r_3$. As explained, the reduction may be by any combinational function $f(P_{i_0}^3)$—which could include independent operators (e.g. max) or associative operators=$P_1(N_0)*P_1(N_1)*P_1(N_2)*P_1(N_3)$. Then, in an all-gather pass, each reduction is provided to all processors to activate a state S3 wherein each processor now holds all four reductions. Note that in S1, the "corresponding" partials, e.g. $P_0(0)$, $P_0(1)$, $P_0(2)$ and $P_0(3)$ may all differ whereas, in state S3, each reduction, e.g. $r_0$ is the same at all processors, where $r_i=f\{(P_i(0), P_i(1), P_i(2) \text{ and } P_i(3))\}$. In machine learning, the set of partial values $P_0$, $P_1$, $P_2$, $P_3$ is a vector. A vector of partials (e.g. updated weights) is produced on each pass of the model during training. The reduction $r_0$, $r_1$, $r_2$, $r_3$ on each processor in state S3 is the full reduction vector. In the context of machine learning, each partial could be a set of updating deltas for a parameter in the model. Alternatively (in an arrangement not described further herein) it could be an updated parameter.

Therefore, as noted an all-reduce operation consists of a reduce-scatter operation, followed by an all-gather operation. During the reduce-scatter operation, each node exchanges different elements of the partial. When the reduce-scatter is complete, all nodes have one nth of the final all-reduce. During the all-gather, each node receives an additional 1/n of the final all-reduce until, after n−1 steps, all of the nodes have the complete data set.

Figure 3A:
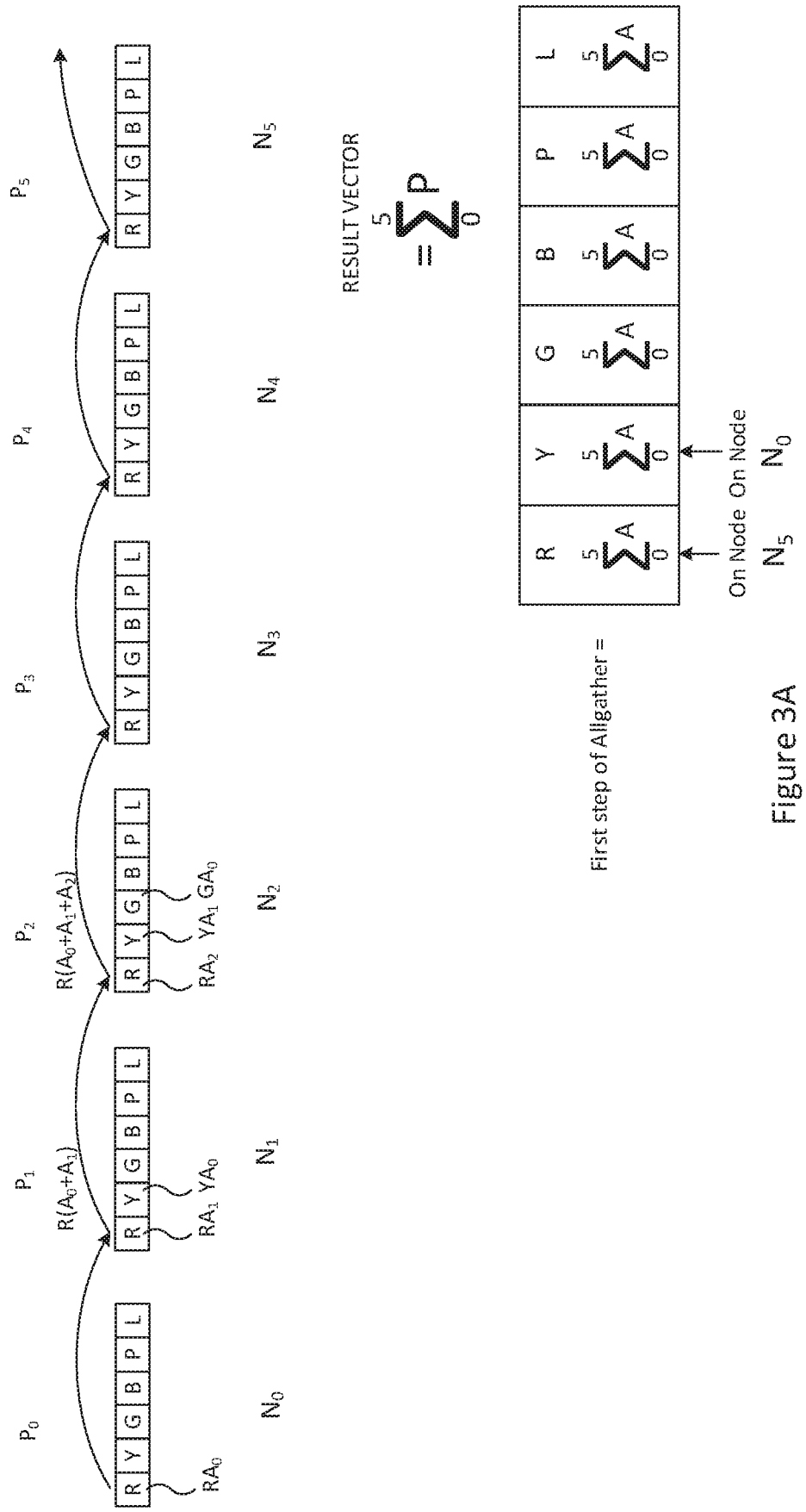
FIG. 3A is a schematic diagram of a stage of a reduce-scatter operation.
Figure 3B:
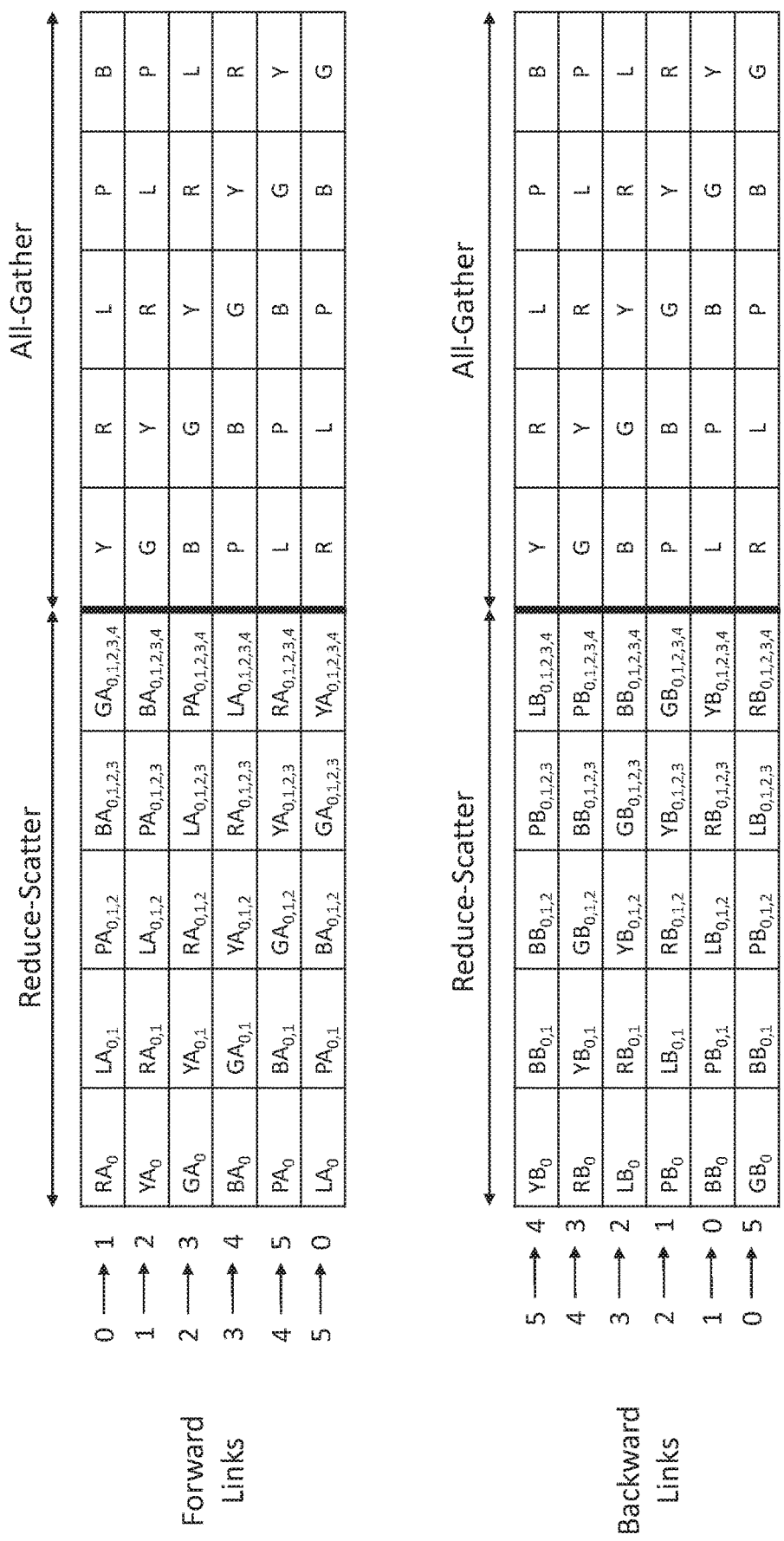
FIG. 3B is a schematic diagram of timing of operations in an all-reduce operation.

FIGS. 3A and 3B illustrate an example of reduce-scatter/all-gather using six "virtual" ID rings. These are also termed "logical" rings herein. FIG. 3A is a schematic diagram illustrating the reduction of partials in multiple virtual rings. Each partial is split into six fragments. In FIG. 3A, the capital letters R, Y, G, B, P, L each denote a different fragment of a partial stored at each processor. The letters denote corresponding fragments which are to be reduced with each other, and define the "virtual" or "logical" ring for those fragments. Looking at FIG. 3A, the "R" fragments in each of the partials $P_0$, $P_1$, $P_2$, $P_3$, $P_4$, and $P_5$ are reduced into a single fragment in the result vector (REQ. Similarly for the Y, G, B, P and L fragments.

FIG. 3B shows a timing diagram with time on the horizontal axis indicating the data exchanges and computations in each step of the all-reduce process. In FIGS. 3A and B, the all-reduce process is accomplished by a reduce-scatter phase followed by an all-gather phase.

The notation in FIGS. 3A and 3B is as follow. The partials are each denoted $P_0$, $P_1$, $P_2$, $P_3$, $P_4$, and $P_5$. At the start of the process, each partial is stored on a respective processor $N_0$, $N_1$, $N_2$, $N_3$, $N_4$, $N_5$. Each fragment is labelled according to its fragment ordinant and its position in the virtual ring in which it is deemed to be reduced. For example, $RA_0$ denotes the R fragment in partial $P_0$, because this is the first fragment in a virtual ring formed by processors $N_0$-$N_1$-$N_2$-$N_3$-$N_4$-$N_5$. $RA_1$ denotes the R fragment calculated at processor $N_1$, which is in the second position in its virtual ring. $YA_0$ denotes the Y fragment calculated at processor $N_1$. The "0" suffix indicates it is the first fragment in its virtual ring, the Y-ring being $N_1$-$N_2$-$N_3$-$N_4$-$N_5$-$N_0$. Note, in particular, that the suffixes on A reflect the virtual rings, and do not correspond to the physical processors (or the partials). Note that FIG. 3A shows only the virtual rings on the forward links. FIG. 3B shows that an equivalent process is occurring on the backward links, with the fragments denoted as B.

In step one, the first fragment (the $A_0$) in each virtual ring is transferred from its processor to the next adjacent processor where it is reduced with the corresponding fragment at that processor. That is, $RA_0$ moves from $N_0$ to $N_1$ where it is reduced with $RA_1$ to form $RA_{0,1}$. The notation 0, 1 indicates that the fragment is formed by the reduction of the first and second fragments in the virtual ring. Note that, in the same step, the $A_0$ fragments of each virtual ring are simultaneously transmitted. That is, the link between $N_1$ and $N_2$ is used to transmit $YA_0$, the link between $N_2$ and $N_3$ is used to transmit $GA_0$, et cetera. In the next step, the corresponding reduced fragments are transmitted over the forward links to their next adjacent processor. For example, $RA_{0,1}$ is transmitted from $N_1$ to $N_2$, and $YA_{0,1}$ is transmitted from $N_2$ to $N_3$. Note that for reasons of clarity, not all fragments in FIG. 3A are numbered. The full set of fragments and numbers are shown in FIG. 3B. This process carries on for five steps. After five steps, there is a reduction of all fragments on each processor. At the end of the fifth step, this reduction is on the last processor of each corresponding ring for that fragment. For example the R reduction is on processor $N_5$.

The beginning of the all-gather phase starts by a transmission from the last to the first processor in each virtual ring. Thus, the final reduction for the R fragments ends on processor $N_5$ ready for the first step of the all-gather phase. The final reduction of the Y fragments correspondingly ends up on the processor $N_0$. In the next step of the all-gather phase, the reduced fragments are transmitted again to their next adjacent processor. Thus the fully reduced R fragment is now also at $N_2$, the fully reduced Y fragment is now also at $N_3$ and so on. In this way, each processor ends up at the end of the all-gather phase with all fully reduced fragments R, Y, G, B, P, L of the partial.

Example embodiments of the disclosure can be applied to control the exchange of data in a machine learning context. Specifically, example embodiments can be applied to control the exchange of data during a reduce-scatter operation described above with respect to FIGS. 2, 3A, and 3B.

Figure 4:
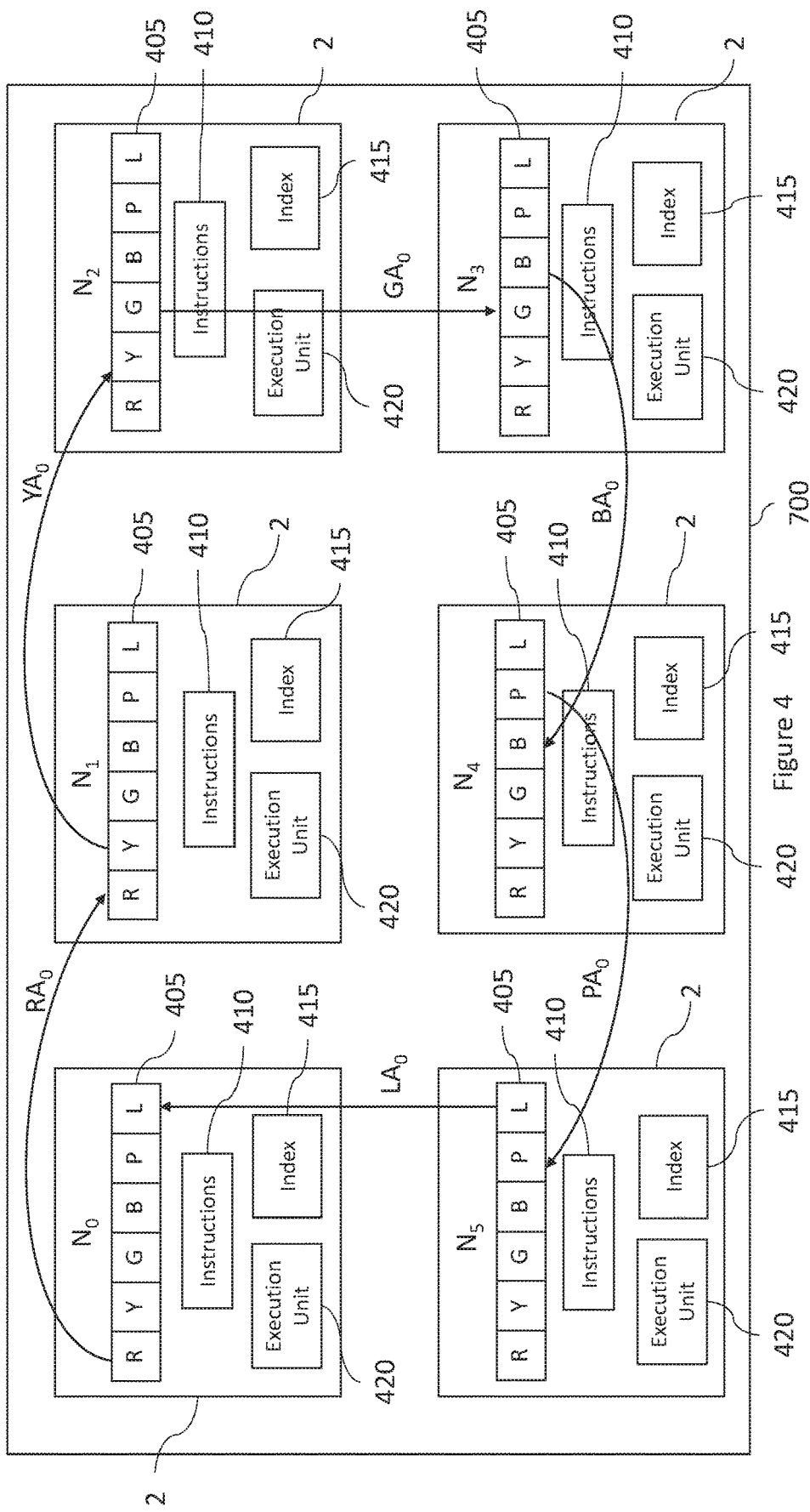
FIG. 4 is a schematic diagram of exchange of data between processors according to operations selected in dependence upon an index value.

Reference is made to FIG. 4, which illustrates an example embodiment of the computer 700 described with respect to FIG. 12. This example embodiments may be applied to control the exchange of data between processors in a machine learning context as described above. In FIG. 4, data is exchanged between the processors 2 of the computer 700 during a particular part of an exchange phase.

As shown in FIG. 4, during a particular part, the execution unit 420 of each processor 2 is configured to select a data fragment/element from its data memory 405 in dependence the index value held in its index storage 415. The execution unit 420 of processor $N_0$ selects and transfers the data labelled $RA_0$ to processor $N_1$ in dependence upon the index value held in storage 415 by processor $N_0$. The execution unit 420 of processor $N_1$ selects and transfers the data labelled $YA_0$ to processor $N_2$ in dependence upon the index value held by processor $N_1$. The execution unit 420 of processor $N_2$ selects and transfers the data labelled $GA_0$ to processor $N_3$ in dependence upon the index value held by processor $N_2$. The execution unit 420 of processor $N_3$ selects and transfers the data labelled $BA_0$ to processor $N_4$ in dependence upon the index value held by processor $N_3$. The execution unit 420 of processor $N_4$ selects and transfers the data labelled $PA_0$ to processor $N_5$ in dependence upon the index value held by processor $N_4$. The execution unit 420 of processor $N_5$ selects and transfers the data labelled $LA_0$ to processor $N_0$ in dependence upon the index value held by processor $N_5$.

In addition to each processor 2 using its index value to select data to be transferred, upon receiving data packets from another processor 2, the execution unit 420 of each processor 2 determines where in memory 405, data fragments derived from the received data packets are to be stored in dependence upon its index value stored in the index storage 415. The execution unit 420 of each processor 2 also selects any other data fragments with which to combine the received data. For example, the execution unit 420 of processor $N_0$ receives the data labelled $LA_0$ from processor $N_5$ and, in dependence upon its index, executes instructions to reduce this with the data $LA_1$ held at location L in memory 405. The execution unit 420 of processor $N_1$ receives the data labelled $RA_0$ from processor $N_0$ and, in dependence upon its index, executes instructions to reduce this with the data $RA_1$ held at location R in memory 405. The execution unit 420 of processor $N_2$ receives the data labelled $YA_0$ from processor $N_1$ and, in dependence upon its index, executes instructions to reduce this with the data $YA_1$ held at location Y in memory 405. The execution unit 420 of processor $N_3$ receives the data labelled $GA_0$ from processor $N_2$ and, in dependence upon its index, executes instructions to reduce this with the data $GA_1$ held at location G in memory 405. The execution unit 420 of processor $N_4$ receives the data labelled $BA_0$ from processor $N_3$ and, in dependence upon its index, executes instructions to reduce this with the data $BA_1$ held at location B in memory 405. The execution unit 420 of processor $N_5$ receives the data labelled $PA_0$ from processor $N_4$ and, in dependence upon its index, executes instructions to reduce this with the data $PA_1$ held at location P in memory 405. The execution unit 420 of processor $N_0$ receives the data labelled $LA_0$ from processor $N_5$ and, in dependence upon its index, executes instructions to reduce this with the data $LA_1$ held at location L in memory 405.

Each of the transferred data fragments may correspond to the data fragments shown in FIGS. 3A and 3B. In such a case, each data fragment corresponds to a subset of the delta values calculated by each processor 2 using its training data. Collectively, the data values held in memory 405 and represented by letters, R, Y, G, B, P, L form a partial vector of delta values that are calculated using the training data provided to the respective processor 2. FIG. 4 illustrates the first step in the reduce-scatter operation shown in FIG. 2, in which each processor 2 is provided a reduced set of fragments comprising one or more delta weights. Each fragment of one or more delta weights that is transferred to a recipient processor 2 is combined with the corresponding fragment of delta weights held in memory 405 of that recipient processor. For example, fragment $RA_0$ is transferred from processor $N_0$ to processor $N_1$ and combined with fragment $RA_1$ in the step shown in FIG. 4. By transferring fragments and combining them in subsequent steps, the reduce-scatter operation is performed. At each step, the fragment that is exchanged between the processors is dependent upon the index value held in index value storage 415. The at least one execution unit of each processor 2 uses this index value to determine which fragment to send and where in memory to store each fragment that it receives.

Figure 4A:
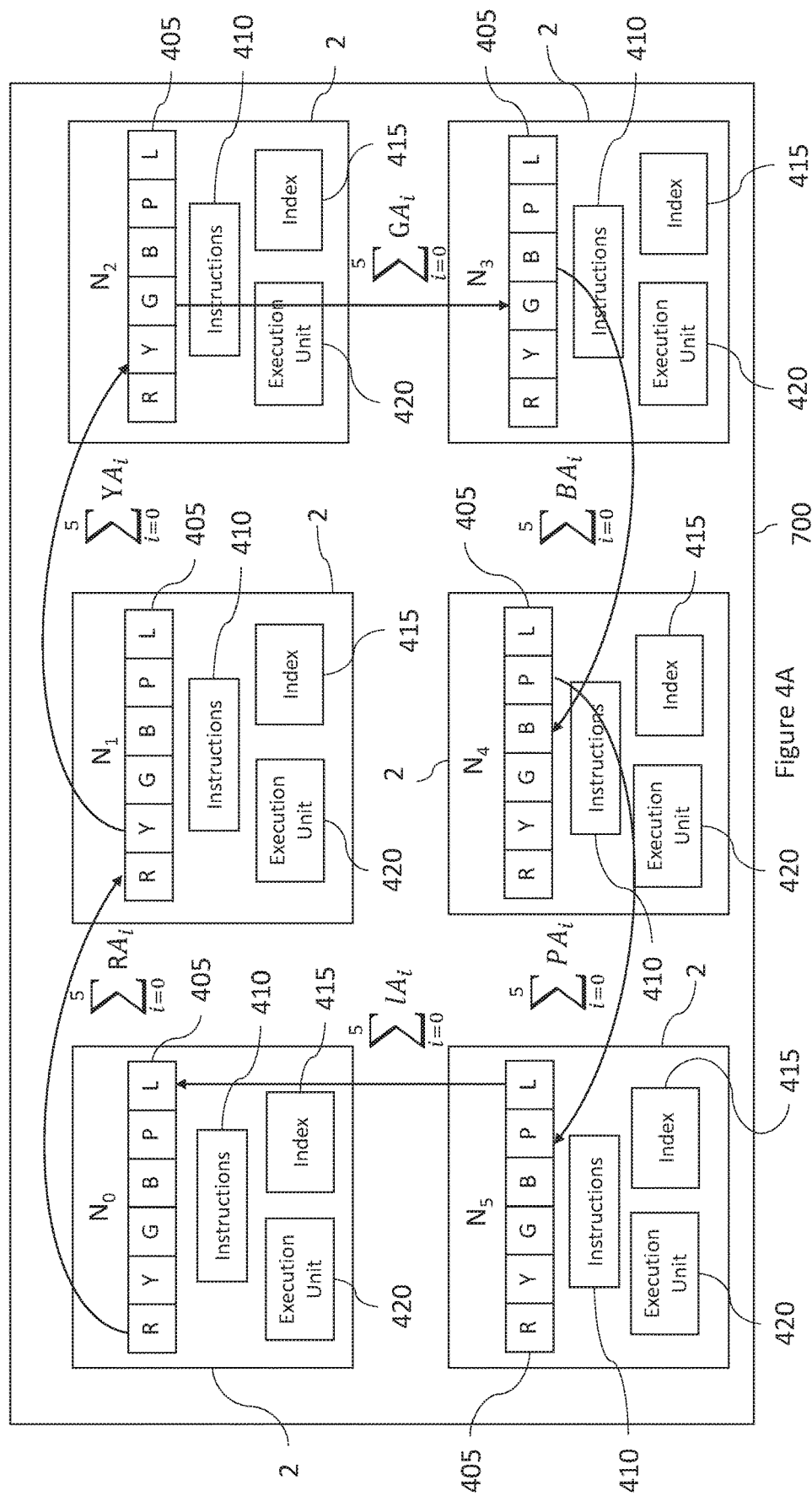
FIG. 4A is a schematic diagram of exchange of data between processors according to operations selected in dependence upon an index value.

Reference is made to FIG. 4A, which illustrates the exchange of data during an all-gather process, which is performed following the reduce-scatter process, as part of the all-reduce process shown in FIG. 2. In FIG. 2, each of the fragments shown in memory 405 in the processors is a reduced fragment, i.e. combination of the corresponding fragments present in memory in FIG. 4 prior to the start of the reduce-scatter operation.

The at least one execution unit 420 of each processor 2 is configured to select and pass a reduced fragment in dependence upon the index value it stores. The execution unit 420 of processor $N_0$ selects and transfers the data labelled $\Sigma_{i=0}^{5}RA_i$ to processor $N_1$ in dependence upon the index value held by processor $N_0$. The execution unit 420 of processor $N_1$ selects and transfers the data labelled $\Sigma_{i=0}^{5}YA_i$ to processor $N_2$ in dependence upon the index value held by processor $N_1$. The execution unit 420 of processor $N_2$ selects and transfers the data labelled $\Sigma_{i=0}^{5}GA_i$ to processor $N_3$ in dependence upon the index value held by processor $N_2$. The execution unit 420 of processor $N_3$ selects and transfers the data labelled $\Sigma_{i=0}^{5}BA_i$ to processor $N_4$ in dependence upon the index value held by processor $N_3$. The execution unit 420 of processor $N_4$ selects and transfers the data labelled $\Sigma_{i=0}^{5}PA_i$ to processor $N_5$ in dependence upon the index value held by processor $N_4$. The execution unit 420 of processor $N_5$ selects and transfers the data labelled $\Sigma_{i=0}^{5}1A_i$ to processor $N_0$ in dependence upon the index value held by processor $N_5$. Each of these data transfers completes the first step of the all-gather operation. By performing the subsequent steps, each processor 2 is provided with each reduced fragment.

In addition to each processor 2 using its index value to select data to be transferred, upon receiving data from another processor 2, the recipient processor determines where in memory the data is to be stored in dependence upon the index value stored in the index storage 415. For example, the execution unit 420 of processor $N_0$ receives the data labelled $\Sigma_{i=0}^{5}1A_i$ from processor $N_5$ and, in dependence upon its index, executes instructions to store this data at location L in memory 405. The execution unit 420 of processor $N_1$ receives the data labelled $\Sigma_{i=0}^{5}RA_i$ from processor $N_0$ and, in dependence upon its index, executes instructions to store this data at location R in memory 405. The execution unit 420 of processor $N_2$ receives the data labelled $\Sigma_{i=0}^{5}YA_i$ from processor $N_1$ and, in dependence upon its index, executes instructions to store this at location Y in memory 405. The execution unit 420 of processor $N_3$ receives the data labelled $\Sigma_{i=0}^{5}GA_i$ from processor $N_2$ and, in dependence upon its index, executes instructions to store this data at location G in memory 405. The execution unit 420 of processor $N_4$ receives the data labelled $\Sigma_{i=0}^{5}BA_i$ from processor $N_3$ and, in dependence upon its index, executes instructions to store this data at location B in memory 405. The execution unit 420 of processor $N_5$ receives the data labelled $\Sigma_{i=0}^{5}PA_i$ from processor $N_4$ and, in dependence upon its index, executes instructions to store this data at location P in memory 405. The execution unit 420 of processor $N_0$ receives the data labelled $\Sigma_{i=0}^{5}1A_i$ from processor $N_5$ and, in dependence upon its index, executes instructions to store this data at location L in memory 405.

Each processor comprises the full set of instructions for transferring data, such as that shown in memory in FIGS. 4 and 4A to a further processor, with the index value controlling the data transfer. The index may control the transfer of data in different ways.

In some embodiments, the index value held by each processor determines the instructions in the set of instructions that are executed by each execution unit 420 to perform the transfer of the appropriate data fragment from memory 405 to another processor 2. Each processor 2 also comprises the full set of instructions for receiving and storing fragments at the appropriate location in memory 405. The index value held by each processor 2 determines the instructions in the set of instructions that are executed by the at least one execution unit 420 of the processor 2 to store a received fragment at the appropriate location. The execution unit 420, in this case, performs a branch operation that depends upon the index value to select a particular set of instructions that are executed for performing the relevant data transfer.

In some embodiments, the at least one execution unit 402 of each processor 2 performs arithmetic operations using the index value as an input to determine the address in data memory 405 from which data is to be read or written to.

In FIGS. 4 and 4A, each of the processors 2 is illustrated as having a unified data memory 405 and instruction memory 410. However, these memories may be distributed throughout their respective processor 2. In some embodiments, each processor 2 may comprise a plurality of processing units, which are referred to herein as tiles. Such an arrangement is described in U.S. patent application Ser. No. 15/886,315, which is incorporated by reference. Each tile comprises a copy of the index for the processor 2 to which it belongs, and is configured to execute operations from its set of instructions that depend upon the index value to implement the appropriate data transfer operations, such as those discussed above with reference to FIGS. 12, 4 and 4A.

Figure 4B:
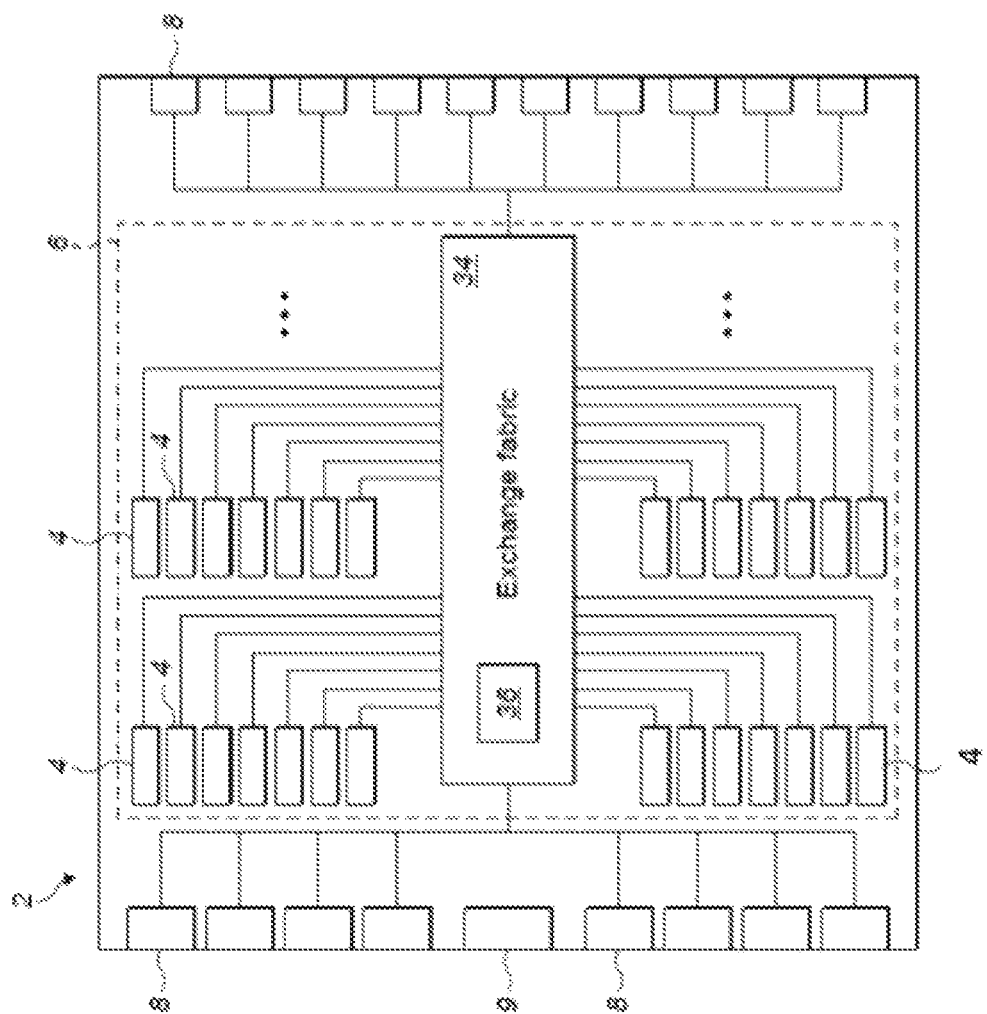
FIG. 4B is a schematic diagram of a multi-tile processor.

Reference is made to FIG. 4B, which illustrates an example of a multi-tile processor 2. The processor 2 comprises an array 6 of multiple processor tiles 4 and an interconnect 34 connecting between the tiles 4. The processor 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of a processor and memory. For instance, by way of illustration the processor 2 may comprise of the order of hundreds of tiles 4, or even over a thousand. For completeness, note also that an "array" as referred to herein does not necessarily imply any particular number of dimensions or physical layout of the tiles 4.

In embodiments, each processor 2 also comprises one or more external links 8, enabling the processor 2 to be connected to one or more other processors (e.g. one or more other instances of the same processor 2). These external links 8 may comprise any one or more of: one or more processor-to-host links for connecting the processor 2 to a host processor, and/or one or more processor-to-processor links for connecting together with one or more other instances of the processor 2 on the same IC package or card, or on different cards. In one example arrangement, the processor 2 receives work from a host processor (not shown) which is connected to the processor via one of the processor-to-host links in the form of input data to be processed by the processor 2. Multiple instances of the processor 2 can be connected together into cards by processor-to-processor links. Thus a host accesses a computer having multiple processors 2, each of which is architected as a multi-tile system on a chip, depending on the workload required for the host application.

The interconnect 34 is configured to enable the different tiles 4 in the array 6 to communicate with one another. However, as well as there potentially being dependencies between threads on the same tile 4, there may also be dependencies between the portions of the program running on different tiles 4 in the array 6. A technique is therefore used to prevent a piece of code on one tile 4 running ahead of data upon which it is dependent being made available by another piece of code on another tile 4.

Each tile 4 is itself a processor capable of executing instructions (code) from a local instruction memory and handling data in local data memory. A tile 4 may comprise a respective instance of a barrel-threaded processor and a memory. For instance, by way of illustration the processor 2 may comprise of the order of hundreds of tiles 4, or even over a thousand. For completeness, note also that an "array" as referred to herein does not necessarily imply any particular number of dimensions or physical layout of the tiles 4.

Communication between tiles 4 on the processor 2 occurs in a time deterministic fashion. However, other forms of inter tile exchange are possible. There may be dependencies between the portions of the program running on different tiles 4 in the array 6. That is, processing data on one tile may depend on results from another tile, e.g. may provide results on which another tile depends. A technique is, therefore, used to prevent a piece of code on one tile 4 running ahead of data upon which it is dependent being made available by another piece of code on another tile 4.

Parallel programming models for AI and Data Science usually follows a 3-phase iterative execution model: Compute, Barrier, and Exchange. The implications are that data transfer to and from a processor is usually barrier dependent to provide data-consistency between the processors and between each processor and a host. Typically used data consistency models are Bulk Synchronous Parallel (BSP), Stale Synchronous Parallel (SSP) and Asynchronous. Embodiments described herein use a BSP model, but it will be apparent that the other synch models could be utilised as an alternative.

Figure 5:
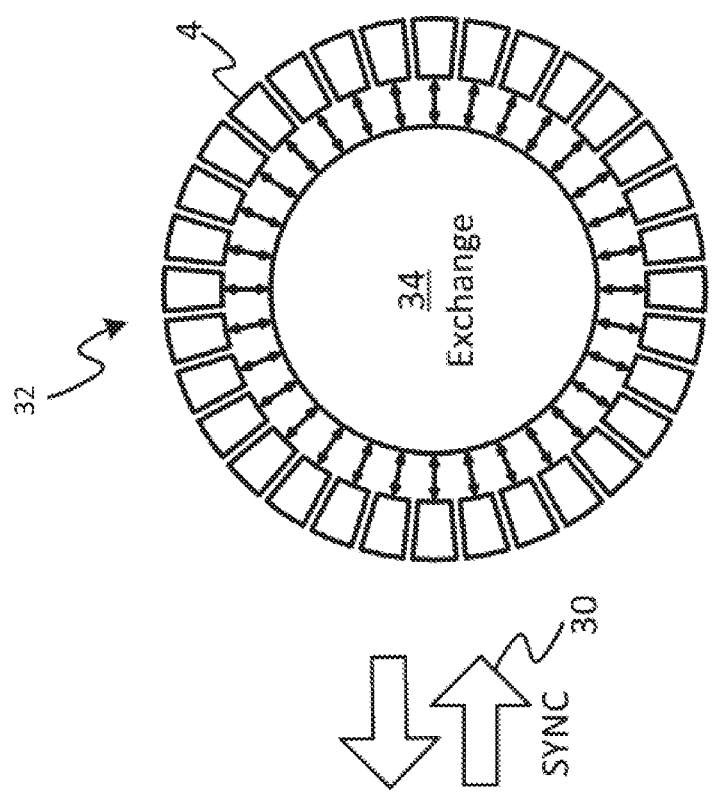
FIG. 5 is a schematic diagram illustrating the compute and exchange phases within a multi-tile processor.
Figure 5:
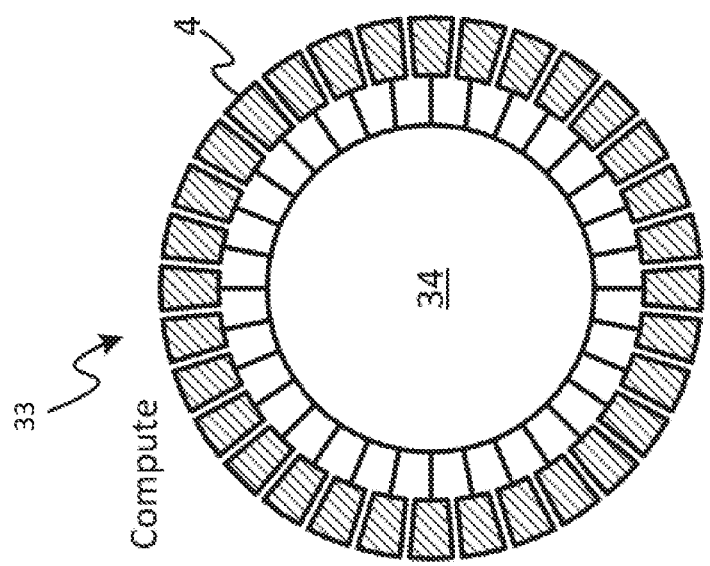
Figure 6:
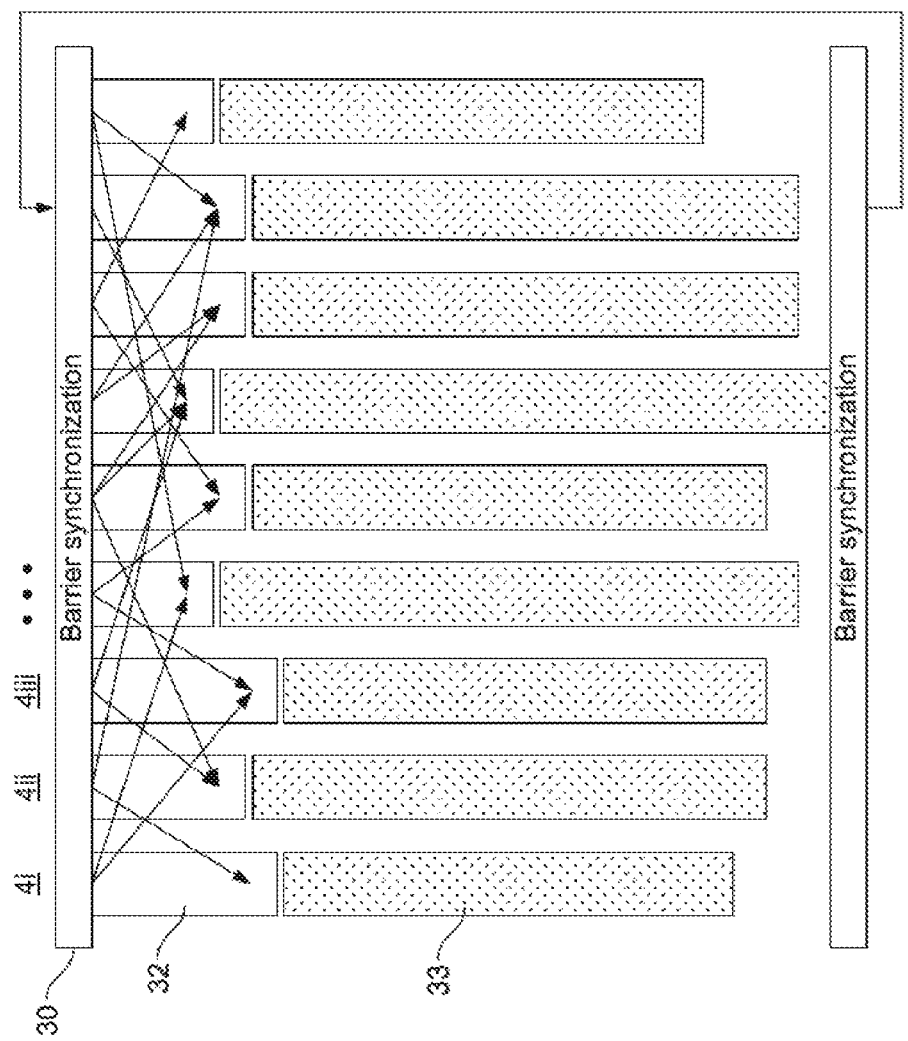
FIG. 6 illustrates exchange of data in a bulk synchronous parallel system.

Reference is made to FIGS. 5 and 6, which illustrate an implementation of a BSP exchange scheme in which each tile 4 performs a compute phase 33 and an exchange phase 32 in an alternating cycle, separated from one to the other by a barrier synchronization 30 between tiles. In the case illustrated by FIGS. 5 and 6, a barrier synchronization is placed between each compute phase 33 and the following exchange phase 32. During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles, but does not perform any new computations until it has received from other tiles 4 any data on which its task(s) has/have dependency. Neither does it send to any other tile, any data except that computed in the preceding compute phase. It is not excluded that other operations such as internal control-related operations may be performed in the exchange phase 32. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual tiles which alternate between phases, and the whole assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

Note also, it is not excluded that multiple different independent groups of tiles 4 on the same processor 2 or different processors could each form a separate respective BSP group operating asynchronously with respect to one another, with the BSP cycle of compute, synchronize and exchange being imposed only within each given group, but each group doing so independently of the other groups. I.e. a multi-tile array 6 might include multiple internally synchronous groups each operating independently and asynchronously to the other such groups (discussed in more detail later). In some embodiments there is a hierarchical grouping of sync and exchange, as will be discussed in more detail later.

FIG. 6 illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that in this arrangement, some tiles 4 are allowed to begin computing 33 whilst some others are still exchanging.

The communication between tiles 4 on a processor 2 occurs in time deterministic fashion in which data packets are transmitted without headers. This is explained in our earlier application U.S. patent application Ser. No. 15/886,315.

Figure 7:
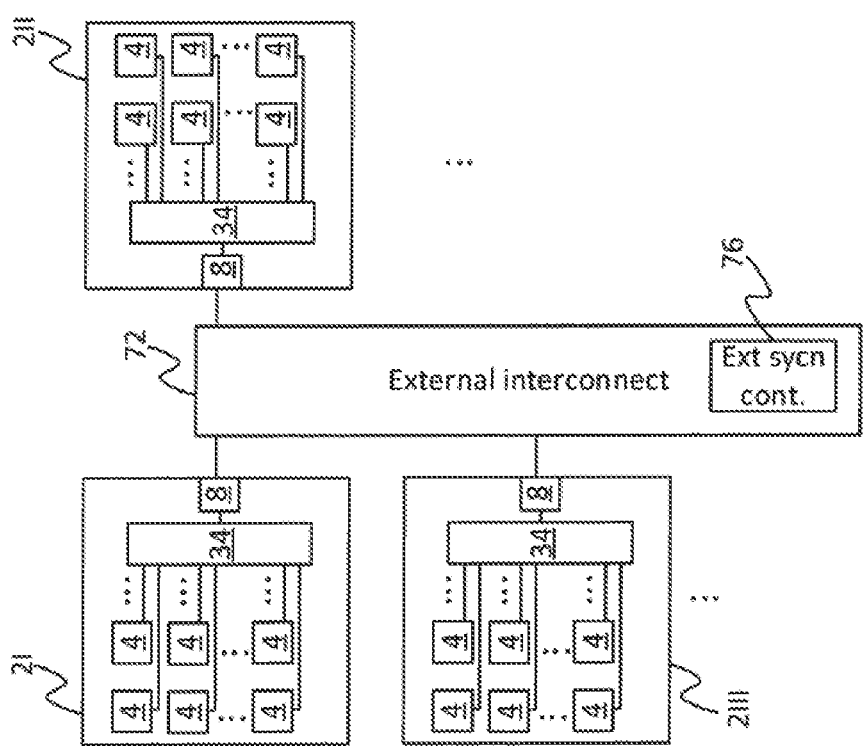
FIG. 7 illustrates the arrangement of multi-tile processors in a computer.

In embodiments, multiple instances of the processor 2 are connected together to form an even larger array of tiles 4 spanning multiple processors 2. This is illustrated in FIG. 7. The processors 2 are connected together by an external interconnect 72 (via the external links 8 shown in FIG. 7). This may connect between processors 2 on the same IC package, different IC packages on the same card, and/or different IC packages on different cards. As well as providing a conduit for exchange of data between tiles 4 on different processors, the external interconnect 72 also provides hardware support for performing barrier synchronization between the tiles 4 on different processors 2 and aggregating the local exit states of the tiles 4 on the different processors 2.

Figure 8:
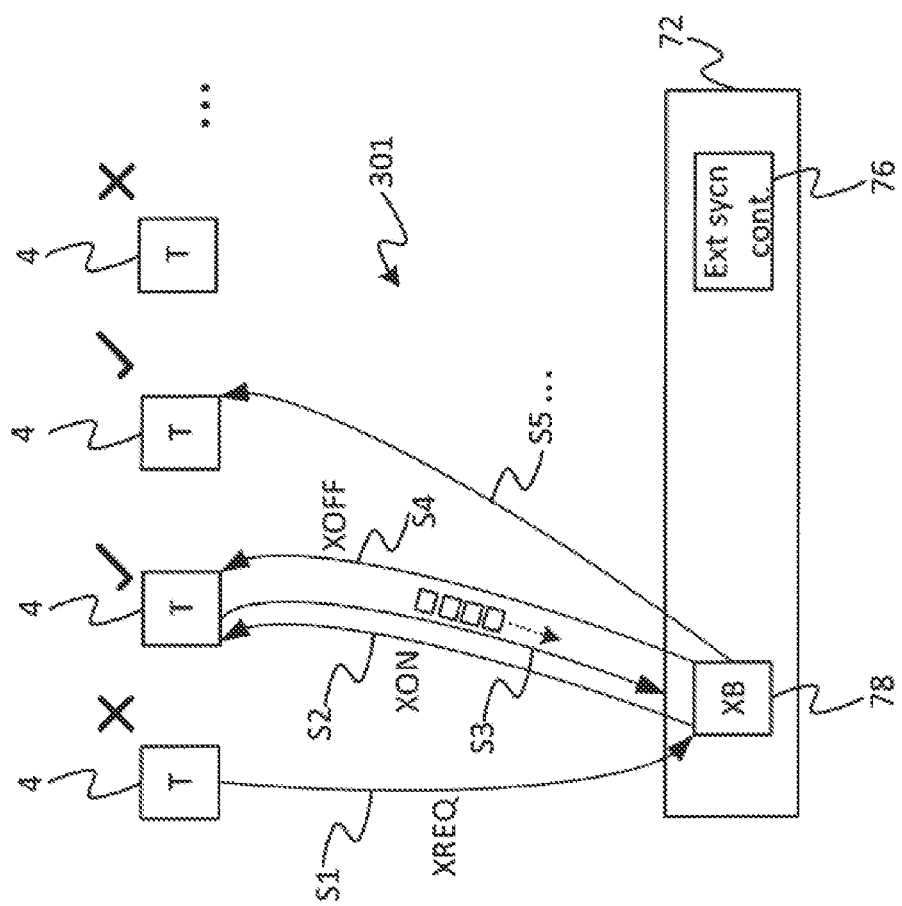
FIG. 8 illustrates exchange of data packet between tiles in a computer.

FIG. 8 illustrates an exemplary mechanism for communicating between processors 2 (external exchange). This mechanism is non-time-deterministic. The mechanism is implemented in dedicated hardware logic in the external interconnect 72. Data is sent over the external interconnect 72 in the form of packets. Unlike the packets sent over the internal interconnect 34, these packets have headers: as the order of transmission can change, the destination address is present in the packet header. The external interconnect 72 includes a routing table for statically routing the data packets between the different processors in dependence upon the headers of the data packets.

At the physical layer, the interconnect mechanism is lossy, but at the transaction layer, the mechanism is not lossy due to the architecture of the link layer: if a packet is not acknowledged it will be resent automatically by the hardware in the interconnect 72. The possibility for loss and resending at the data link layer, however, means that the delivery of data packets over the external interconnect 72 is not time-deterministic. Further, all the packets of a given exchange may arrive together or separated apart in time, and in any order, so the external interconnect employs flow control and queuing. Further, the interconnect may use clock-data-recovery (CDR) technology to infer a clock from a received data stream having sufficient data signal transitions to maintain bit-lock. This inferred clock will be of unknown phase relationship to the sending clock and hence represent an additional source of non-determinism.

As illustrated, the external interconnect 72 comprises an external exchange block (XB) 78. The compiler nominates one of the tiles 4 to send an external exchange request (XREQ) to the exchange block 78 (operation S1). The XREQ is a message comprising one or more control packets, indicating which of the tiles 4 have data packets (content) to send to another tile or tiles 4 on another processor 2. This is illustrated schematically in FIG. 8 by the ticks and crosses: by way of an example scenario, those labelled with a tick have data packets to send externally and those labelled with a cross do not. In operation S2, the exchange block 78 sends an exchange-on (XON) control packet to a first of the tiles 4 with data to send externally. This causes the first tile to start sending its packets to the relevant destination via the external interconnect 78 (operation S3). The data packets received from the first tile at the external interconnect are statically routed to the destination using a routing table in the external interconnect 78. If at any time, the XB 78 is unable to continue sending packets to the interconnect (e.g. due to a previous packet loss and re-transmission in the interconnect, or due to over-subscription of the external interconnect by many other XBs and tiles) the XB 78 will send an exchange-off (XOFF) to that tile before the XBs queue overflows. Once the congestion is cleared and the XB 78 again has sufficient space in its queue it will send an XON to the tile allowing it to continue transmitting its content. Once this tile has sent its last data packet, then in operation S4 the exchange block 78 sends an exchange-off (XOFF) control packet to this tile, then in operation S5 sends another XON to the next tile 4 with data packets to send, and so forth. The signalling of XON and XOFF are implemented as a hardware mechanism in dedicated hardware logic in the form of the external exchange block 78.

Figure 9:
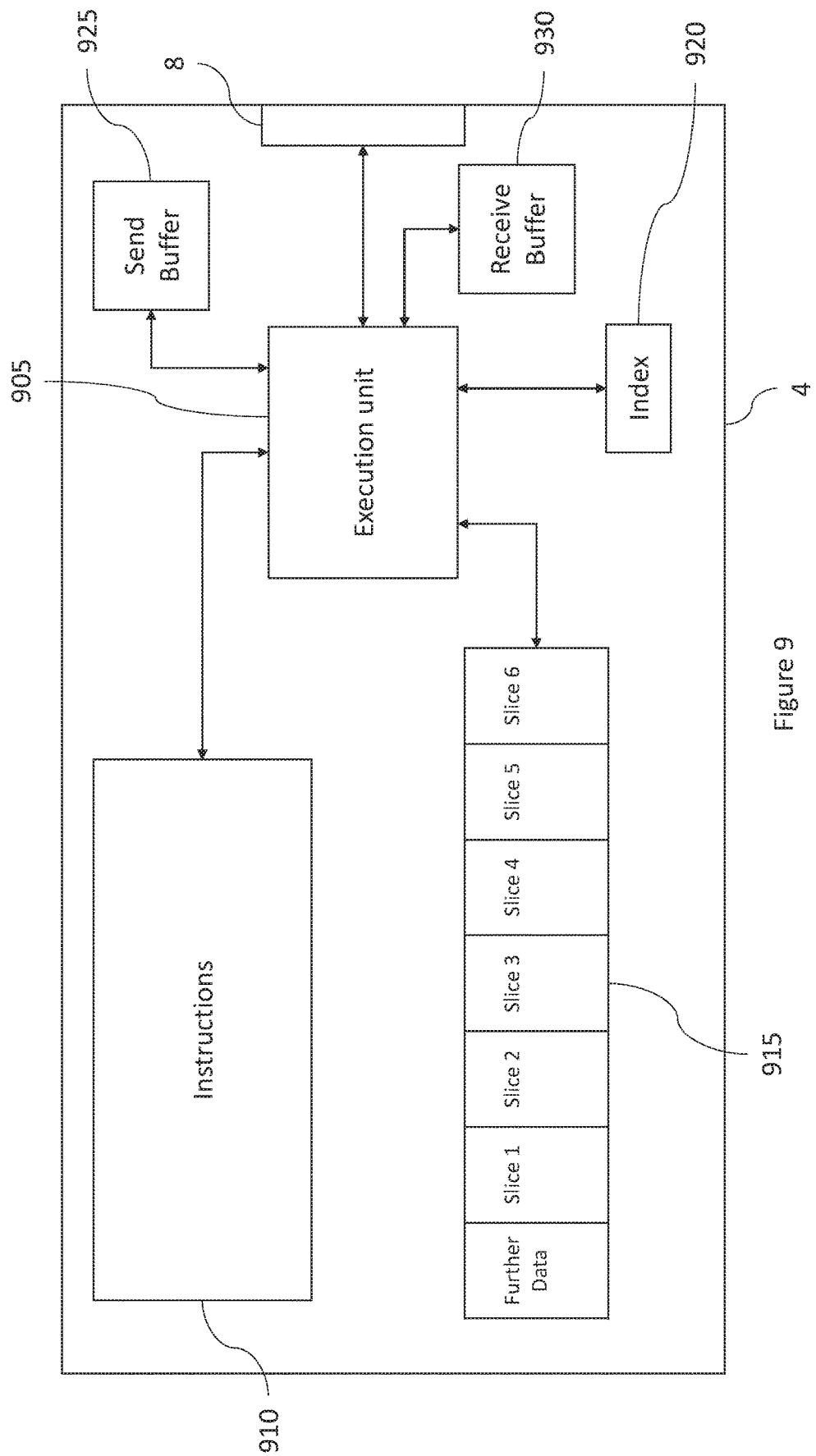
FIG. 9 is a simplified schematic illustration of a tile of a multi-tile processor.

Reference is made to FIG. 9, which illustrates an example of a tile 4 that is part of a processor 2. The tile 4 comprises at least one execution unit 905, which may perform arithmetic and logical operations, address calculations, load and store operations, and other operations, as defined by the instructions stored in instruction memory 910. The execution unit 905 is configured to execute the instructions to perform operations on data held in the data memory 915. The instructions held in the instruction memory 910 of each tile 4 may be considered as a subset of the set of instructions held in instruction memory 410 shown for the overall processor 2 in FIGS. 4 and 4A. The instruction memory 410 may be considered to be a distributed memory comprising the instruction memory 910 of each tile 4.

Figure 10:
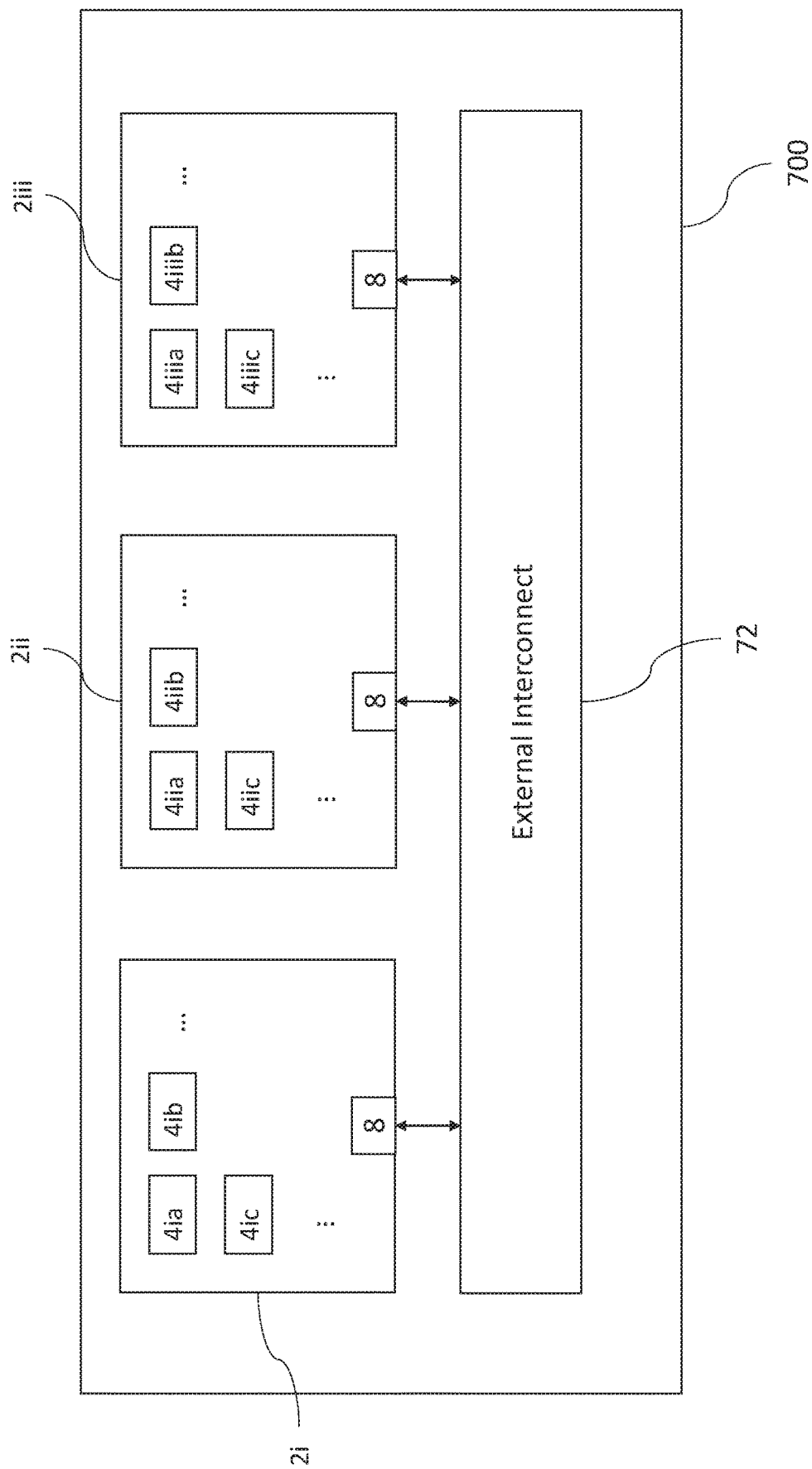
FIG. 10 illustrates the arrangement of tiles in a multi-processor computer.

The instructions held in the instruction memory 910 may be the same in corresponding tiles 4 of each processor 2. Reference is made to FIG. 10, which illustrates how different tiles 4 of each processor 2 correspond to one another. A first processor 2*i* comprises a tile 4*ia*. A second processor 2*ii* comprises a tile 4*iia*. A third processor 2*iii* comprises a tile 4*iiia*. Each of the tiles, 4*ia*, 4*iia*, and 4*iiia* are loaded with the same instructions. The operations performed by the execution units 905 of each tile 4*ia*, 4*iia*, 4*iiia* differ depending upon the index of the respective processor 2 to which they belong. Similarly, the first processor 2*i* comprises a tile 4*ib*. A second processor 2*ii* comprises a tile 4*iib*. A third processor 2*iii* comprises a tile 4*iiib*. Each of the tiles, 4*ib*, 4*iib*, and 4*iiib* are loaded with the same instructions. The operations performed by the execution unit 905 of each tile 4*ib*, 4*iib*, 4*iiib* differ depending upon the index of the processor 2 to which they belong. Therefore, it will be appreciated that, since each corresponding tile 4 in the processors 2 is loaded with an identical set of instructions, each processor 2 in the computer 700 comprises the same overall set of instructions. Referring back to FIG. 9, during the compute phase, certain operations are performed on the data held in data memory 915 to alter the values of such data. Since the instructions held in the instruction memory 910 are the same in corresponding tiles 4 across different processors 2, the operations performed to manipulate the data held in data memory 915 during the compute phase may be the same across corresponding tiles of the processors 2. However, in some embodiments, the instructions held in the instructions memory 910 may be data dependent, such that different operations are performed during the compute phase in dependence upon the different set of data held in the data memory 915.

The tile 4 comprises an index value held in index value store 920. The operations performed by the execution unit 905 during the compute phase to manipulate the data held in data memory 915 are independent of the index value held in the index value store 920. However, the operations performed by the execution unit 905 during the exchange phase with other processors 2 depend upon the index value. Although the index storage 920 is shown as being separate to the instruction memory 910, in some embodiments the index storage 920 and instruction memory 910 may form part of a single memory array.

As shown, the data held in data memory 915 is divided into different portions/fragments (shown as slices). Prior to the data being exchanged with other tiles, the at least one execution unit 905 is configured to execute instructions to transfer data from one or more of the portions to a send buffer 925. The execution unit 905 selects the data to transfer in dependence upon the index value held in index storage 920. The execution unit 905 then passes the selected data to the send buffer 925. During an exchange phase, the execution unit 905 executes instructions to send the data via interface 8. Sending the data via interface 8 comprises appending headers to the data packets with destination addresses for the data in another processor 2. The data packets are sent to that processor 2 in accordance with the scheme discussed above with respect to FIG. 8.

During an exchange phase, the tile 4 is configured to receive one or more data packets. These data packets are received from tiles on other processors 2. Upon receiving the one or more data packets, the data packets are stored in the receive buffer 930. The at least execution unit 905 executes instructions to handle the received data in dependence upon the index value held in storage 920. The at least one execution unit 905 is configured to store data derived from the data packets at locations in data memory 915 in dependence upon the index value held in storage 920. The at least one execution unit 905 may also perform operations, such as a reduction operation, with the data from the received data packets and the data stored in memory 915 prior to storing the result of the operation in memory 915.

Therefore, the index value held in storage 920 is used by the at least one execution unit 905 to at least one of: select data at certain addresses from memory 915 for sending, select data for performing operations on received data (e.g. reduction operations), and storing results from derived from received data at certain addresses in memory 915 that depend on the index value.

There are different ways in which the index value may be used by the execution unit 905 to select an address in memory 915 for storing the data.

In some embodiments, the different data portions are arranged contiguously in memory 915. The execution unit 905 is configured to calculate the address in memory 915 at which data is to be read from or written to in dependence upon the index value. The execution unit 905 calculates the address by performing operations defined in the instructions in instruction memory 910. The operations are arithmetic operations.

In some embodiments, the instruction memory 910 stores a plurality of portions of code, each configured to control data transfer differently. For example, one portion of code may cause data at a certain memory location in memory 915 to be transmitted to another processor 2, whilst another portion of code may cause the execution unit 905 to cause data at a different memory location in memory 915 to be transmitted to another processor 2. Another portion of code may cause received data to be stored at a certain location in memory 915 or cause a certain operation to be carried out with respect to the received data. The execution unit 905 executes code from the instruction memory 915 and, at a point in the execution sequence at which data is to be read from or written to the memory 915, the execution unit 905 performs a branch operation to select a portion of code for performing read or write operations for the data. The portion of code is selected in dependence upon the index value.

According to an exemplary application of the techniques disclosed herein, each processor 2 is provided with different set of training data for producing delta weights so as to train a machine learning model. In this case, each tile 4 is provided with a different set of training data for producing one or more of the delta weights. Together, all of the tiles 4 of each processor 2 together produce a full set of delta weights, which are averaged with the delta weights produced on other processors 2. In some embodiments, the execution unit 905 is configured to switch between processing different worker threads. The execution unit 905, in this case, is part of a barrel-threaded processor as described in U.S. patent application Ser. No. 15/886,315. In this case, each worker thread is programmed to perform the computations associated with a respective individual one of the processors in a machine intelligence graph. In this case, at least some of the edges between processors correspond to the exchanges of data between threads. The threads between which data is exchanged may be threads running on the same execution unit 905 or may be threads running on execution units of different tiles 4. Some may involve exchanges between different tiles of the processor 2. The slices shown in memory 915 may each correspond to a delta value associated with a particular edge between processors, with the delta values being calculated by the execution unit 905 during training. The memory 915 is also shown as including further data. This further data may include data for producing the delta values, such as the training data, the current values of the weights and any further data defining the machine learning model, such as activation functions, number of processors in each layer, etc.

Figure 11:
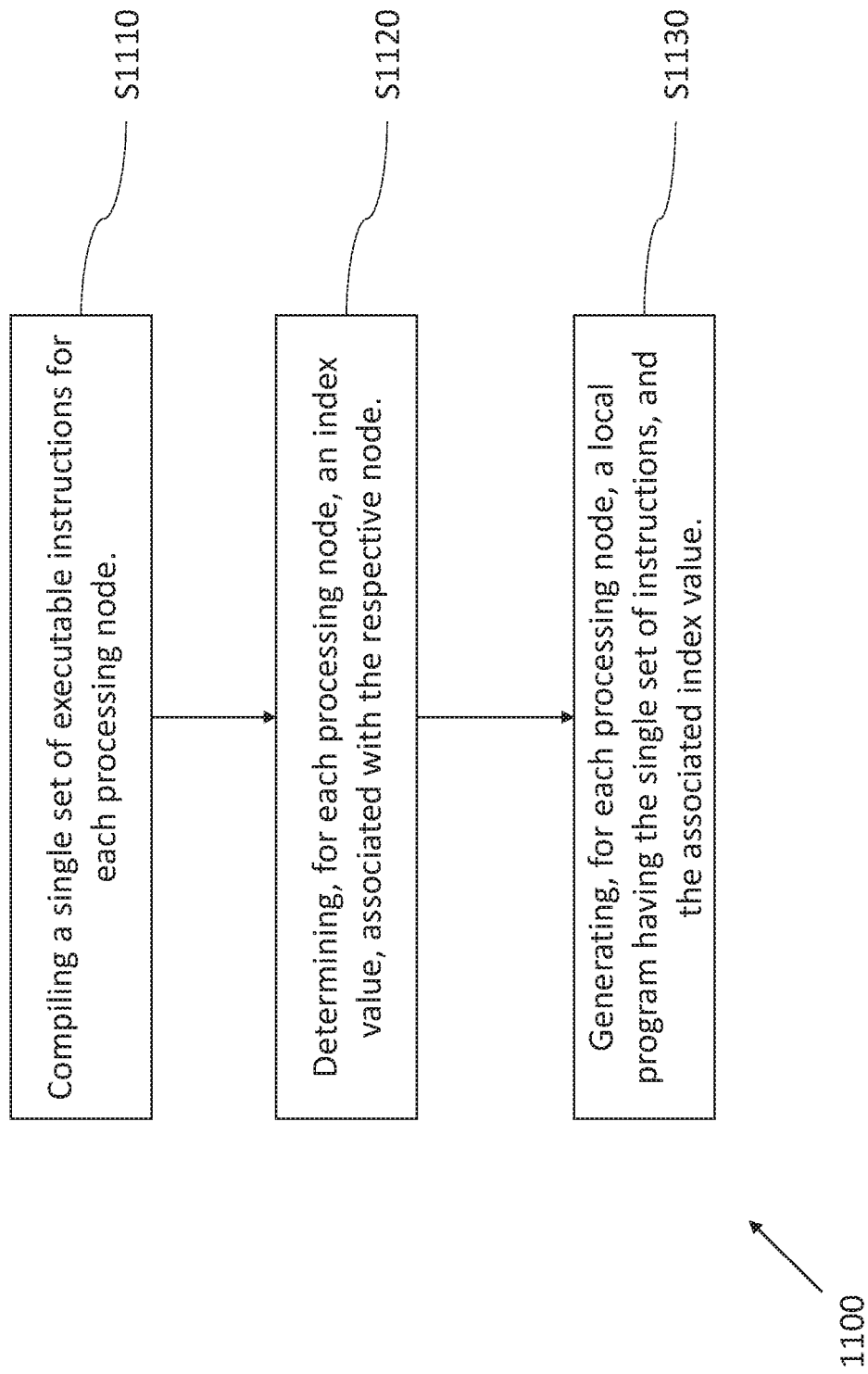
FIG. 11 illustrates a method for compiling a program for each processor in a computer.

Reference is made to FIG. 11, which illustrates a compilation process for compiling a program for each processor in a computer, such as computer 700 shown in FIG. 12. Together the set of instructions and the index value discussed above constitute the program for execution on each processor 2. The compiled set of instructions for each processor 2 is the same, with different index values for each processor 2 being added to the set of instructions.

The method 1100 is performed by a compiler, which may execute on any suitable computing apparatus comprising at least one execution unit and at least one memory holding computer code for execution by the at least one execution unit.

At step S1110, the compiler compiles a single set of executable instructions for providing to each processor 2. The single set of executable instructions is in the form of an executable image. The set of executable instructions may comprise a plurality of subsets of instructions, with each subset being for execution by a different tile 4 of the processor 2.

At step S1120, the compiler determines for each processor 2 in the computer 700, an index value associated with the processor 2. Each index value that is determined uniquely identified a different processor 2 within the computer 700.

A step S1130, the compiler generates, for each processor 2, a local program comprising the single set of instructions and the index value associated with the processor 2. The compiler does so by, for each processor 2, taking the compiled set of instructions produced in S1110 and patching this set of instructions with the index value for the processor determined in S1120.

It will be appreciated that the above embodiments have been described by way of example only. While particular embodiments have been described, other applications and variants of the disclosed techniques may become apparent to a person skilled in the art once given the disclosure herein.

The invention claimed is:

1. A computer comprising a plurality of processors, each of which are configured to perform operations on data, each processor comprising:
   a plurality of processing units;
   a plurality of storages comprising a program comprising:
      a plurality of subsets of a set of executable instructions; and
      an index value identifying the respective processor amongst the plurality of processors, wherein the plurality of storages comprises at least one storage in each of the processing units of the processor, each storage storing a copy of the index value of its corresponding processor and a respective one of the subsets of the set of executable instructions for the corresponding processor;

a plurality of data memories storing data for use in calculations specified by the set of executable instructions for the corresponding processor, wherein the plurality of data memories comprises a data memory in each one of the processing units;

a plurality of execution units comprising an execution unit in each of the processing units, each of at least some of the execution units being arranged to execute at least part of the respective one of the subsets of the set of executable instructions for the corresponding processor to:

select, in dependence upon the respective index value, operations for performing data transfer between the respective data memory and at least one other of the processors; and perform the selected operations for performing data transfer.

2. A computer as claimed in claim 1, wherein for a first one of the processing units of a first of the processors, the selecting, in dependence upon the respective index value, operations for performing data transfer comprises selecting the at least one other of the processors to which data is transferred.

3. A computer as claimed in claim 1, wherein for a first one of the processing units of a first of the processors, the operations cause data transfer between a region of the respective data memory selected in dependence upon the respective index value, and the at least one other of the processors.

4. A computer as claimed in claim 3, wherein for the first one of the processing units of the first of the processors, the respective execution unit is configured to calculate an address of the respective region of data memory by performing arithmetic operations on the respective index value.

5. A computer as claimed in claim 3, wherein for the first one of the processing units of the first of the processors, the respective execution unit is configured to branch to at least one instruction in the respective one of the subsets of the set of executable instructions for the corresponding processor in dependence upon the respective index value, wherein the at least one instruction, when executed by the respective at least one execution unit, causes data transfer between the respective region of data memory and the at least one other of the processors.

6. A computer as claimed in claim 3, wherein for the first one of the processing units of the first of the processors, the operations comprise storing data received from the at least one other of the processors in the respective region of data memory.

7. A computer as claimed in claim 1, wherein, for a first one of the processing units of a first of the processors, the operations comprise selecting, in dependence upon the respective index value, data stored in the respective data memory and transmitting the selected data to the at least one other of the processors.

8. A computer as claimed in claim 7, wherein the execution unit of the first one of the processing units of a first of the processors is configured to process the respective selected data to produce a data packet comprising the respective selected data and a header comprising an address of a buffer on the at least one other of the processors.

9. A computer as claimed in claim 1, comprising routing hardware configured to statically route data that is transferred in the data transfer.

10. A computer as claimed in claim 1, wherein for a first one of the processing units of a first of the processors:

the operations comprise combining data received from the at least one other of the processors with further data stored in the respective data memory; and a respective execution unit is configured to select the further data from the respective data memory in dependence upon the respective index value.

11. A computer as claimed in claim 1, wherein for a first one of the processing units of a first of the processors:

the respective data memory comprises a plurality of delta weights for at least one machine learning model; and the data transfer between the respective data memory and the at least one other of the processors comprises controlling the transfer of one or more of the delta weights between the respective data memory and the at least one other of the processors.

12. A computer as claimed in claim 11, wherein for the first one of the processing units of a first of the processors, the respective execution unit is configured to select the one or more delta weights from the respective data memory in dependence upon the respective index value and cause the transfer of the selected one or more delta weights to the at least one other of the processors.

13. A computer as claimed in claim 11, wherein for the first one of the processing units of the first of the processors, the respective execution unit is configured to:

select the one or more delta weights from the respective data memory in dependence upon the respective index value; and reduce the selected one or more delta weights with one or more further delta weights received from the at least one other of the processors.

14. A computer as claimed in claim 1, wherein each processor in the computer is a system on chip.

15. A computer implemented method of generating multiple programs, each of which being suitable for execution by a computer comprising a plurality of processors, each processor having a plurality of processing units, each processing unit comprising at least one memory for holding a local program subset, an execution unit for executing the respective local program subset and data memory for holding data, the method comprising:

compiling a single set of executable instructions;

determining a first index value for a first one of the processors and a second index value for a second one of the processors; and generating, for the first one of the processors, a first local program comprising the single set of instructions and the first index value, and generating, for the second one of the processors, a second local program comprising the single set of instructions and the second index value, wherein the single set of instructions comprises a plurality of subsets of instructions, wherein each of the plurality of subsets of instructions, when allocated to a respective one of the processing units of the first one of the processors, is scheduled to execute on its respective execution unit to cause:

performing operations on data for the computer;

selecting, in dependence upon the first index value, operations for performing data transfer between its respective data memory and the second one of the processors for the computer; and performing the selected operations for performing data transfer.

16. A non-transitory computer readable medium comprising a data memory included in a first processing unit of a plurality of processing units within a first processor of a plurality of processors, the data memory including a local program for the first processing unit, the local program comprising:
- a single set of executable instructions that is the same as a set of executable instructions on other processors of the plurality of processors; and
- an index value, associated with the first processor on which the local program is scheduled to run, the index value being different from other index values associated with other processors of the plurality of processors,
- wherein the local program, when allocated to the first processing unit, is scheduled to execute on an execution unit of the first processing unit to cause:
  - performing operations on data during a compute phase for the computer;
  - selecting, in dependence upon the index value, operations for performing data transfer between the data memory and a second processor of the plurality of processors during an exchange phase for the computer; and
  - following a pre-compiled synchronisation barrier, performing the selected operations for performing data transfer during the exchange phase.

17. The computer implemented method of claim 15, wherein each subset of the second local program, when allocated to a respective one of the processing units of the second one of the processors, is scheduled to execute on its respective execution unit to cause:
- performing operations on data during the compute phase for the computer;
- selecting, in dependence upon the second index value, operations for performing data transfer between its respective data memory and the first one of the processors during the exchange phase for the computer; and
- following a pre-compiled synchronisation barrier, performing the selected operations for performing data transfer during the exchange phase.

18. A computer as claimed in claim 1, wherein each of the plurality of processors is configured to:
- perform the operations on data during a compute phase for the computer; and
- perform the exchanging of data with at least one other of the processors of the computer during an exchange phase for the computer, the exchange phase being separated from the compute phase by a pre-compiled synchronisation barrier,
- wherein for each of the processors, each of the at least some of the execution units are configured to perform the respective selected operations for performing data transfer during the exchange phase for the computer.

* * * * *